United States Patent
Brady

(10) Patent No.: US 12,177,735 B2
(45) Date of Patent: Dec. 24, 2024

(54) SYSTEM AND METHODS FOR AUTOMATICALLY ON-BOARDING TELEMATICS UNITS IN VEHICLES

(71) Applicant: Tracematics Limited, Dublin (IE)

(72) Inventor: Thomas Brady, Dublin (IE)

(73) Assignee: Tracematics Limited, Dublin (IE)

( * ) Notice: Subject to any disclaimer, the term of this patent is extended or adjusted under 35 U.S.C. 154(b) by 0 days.

(21) Appl. No.: 18/232,268

(22) Filed: Aug. 9, 2023

(65) Prior Publication Data
US 2023/0388741 A1 Nov. 30, 2023

Related U.S. Application Data

(63) Continuation of application No. 18/097,709, filed on Jan. 17, 2023, now Pat. No. 11,871,297, which is a (Continued)

(30) Foreign Application Priority Data

Jan. 27, 2017 (GB) ..................... 1701390

(51) Int. Cl.
*H04W 4/021* (2018.01)
*G06Q 10/0631* (2023.01)
(Continued)

(52) U.S. Cl.
CPC ...... *H04W 4/021* (2013.01); *G06Q 10/06314* (2013.01); *G06Q 30/0645* (2013.01);
(Continued)

(58) Field of Classification Search
CPC ....... H04W 4/029; H04W 4/021; H04W 4/40; G06Q 50/40; G06Q 10/06314; G06Q 30/0645; G08G 1/207
See application file for complete search history.

(56) References Cited

U.S. PATENT DOCUMENTS 9,602,970 B1 3/2017 Mahapatra
9,924,315 B1 3/2018 Cornwall et al.
(Continued)

FOREIGN PATENT DOCUMENTS

CN 102158951 A * 8/2011
JP 2001343446 A 12/2001
(Continued)

OTHER PUBLICATIONS

European Patent Office, International Search Report issued in International Application No. PCT/EP2018/052073, dated May 7, 2018 (9 pages).

*Primary Examiner* — Dung Hong
(74) *Attorney, Agent, or Firm* — THE MARBURY LAW GROUP, PLLC

(57) ABSTRACT

Methods and systems for detecting malfunctioning on-board telematics units in vehicles. A computing device may receive a first and second geofence location for a vehicle from a fleet management system. The computing device may determine whether it received a third location from an on-board telematics unit of the vehicle within a time period between receiving the first geofence location and receiving the second geofence location. The computing device may determine that the on-board telematics unit associated with the vehicle is in a state of anomaly in response to determining that the third location was not received from the on-board telematics unit of the vehicle within a time period between receiving the first geofence location and receiving the second geofence location.

27 Claims, 12 Drawing Sheets

Related U.S. Application Data continuation of application No. 17/343,834, filed on Jun. 10, 2021, now Pat. No. 11,595,779, which is a continuation of application No. 16/480,553, filed as application No. PCT/EP2018/052073 on Jan. 29, 2018, now Pat. No. 11,076,258.

(51) Int. Cl.
  *G06Q 30/0645* (2023.01)
  *G06Q 50/40* (2024.01)
  *G08G 1/00* (2006.01)
  *H04W 4/029* (2018.01)
  *H04W 4/40* (2018.01)

(52) U.S. Cl.
  CPC ............ *G06Q 50/40* (2024.01); *G08G 1/207* (2013.01); *H04W 4/029* (2018.02); *H04W 4/40* (2018.02)

(56) References Cited

U.S. PATENT DOCUMENTS

| | | | |
|---|---|---|---|
| 2005/0128103 A1* | 6/2005 | Bachelder | G08G 1/087 340/906 |
| 2007/0115101 A1 | 5/2007 | Creekbaum et al. | |
| 2007/0143013 A1 | 6/2007 | Breen | |
| 2007/0176771 A1 | 8/2007 | Doyle | |
| 2008/0086266 A1 | 4/2008 | Howard et al. | |
| 2008/0129491 A1 | 6/2008 | Ruperto | |
| 2008/0162034 A1 | 7/2008 | Breen | |
| 2009/0164053 A1* | 6/2009 | Oesterling | G07C 5/008 701/2 |
| 2010/0228434 A1* | 9/2010 | Leyerle | B60Q 5/008 701/36 |
| 2011/0063138 A1 | 3/2011 | Berkobin et al. | |
| 2011/0251990 A1* | 10/2011 | Yarvis | G06Q 30/02 706/46 |
| 2012/0054028 A1* | 3/2012 | Tengler | G06Q 30/02 701/438 |
| 2012/0078460 A1 | 3/2012 | Mortensen | |
| 2012/0296579 A1 | 11/2012 | Poling et al. | |
| 2013/0024060 A1 | 1/2013 | Sukkarié et al. | |
| 2013/0045760 A1 | 2/2013 | Obermeyer et al. | |
| 2014/0062730 A1 | 3/2014 | Berkobin | |
| 2014/0195100 A1* | 7/2014 | Lundsgaard | G07C 5/008 701/29.6 |
| 2014/0249700 A1 | 9/2014 | Elias et al. | |
| 2014/0278027 A1 | 9/2014 | Burke et al. | |
| 2014/0328248 A1* | 11/2014 | Greubel | H04W 8/005 370/328 |
| 2014/0375480 A1 | 12/2014 | Morgan et al. | |
| 2014/0379169 A1* | 12/2014 | Camacho | H04L 67/306 709/219 |
| 2015/0026047 A1* | 1/2015 | Johnson, Jr. | G06Q 20/223 705/39 |
| 2015/0081212 A1 | 3/2015 | Mitchell et al. | |
| 2015/0127570 A1* | 5/2015 | Doughty | G06Q 50/265 705/325 |
| 2015/0258961 A1 | 9/2015 | Doherty et al. | |
| 2015/0301543 A1 | 10/2015 | Janoso et al. | |
| 2015/0355703 A1* | 12/2015 | Macdonald | G06F 1/3206 701/36 |
| 2016/0071333 A1* | 3/2016 | Haidar | G07C 5/006 701/29.3 |
| 2016/0092950 A1* | 3/2016 | Driscoll | G06Q 30/0609 705/26.8 |
| 2016/0093216 A1 | 3/2016 | Lee et al. | |
| 2017/0039666 A1* | 2/2017 | Kuersten | G06Q 30/0251 |
| 2017/0215045 A1 | 7/2017 | Rasal et al. | |
| 2017/0241378 A1 | 8/2017 | Nakano | |
| 2017/0253258 A1 | 9/2017 | Bramucci et al. | |
| 2017/0289754 A1* | 10/2017 | Anderson | H04W 4/021 |
| 2017/0372611 A1 | 12/2017 | Kodama et al. | |
| 2018/0120848 A1 | 5/2018 | Kulferst | |
| 2018/0148037 A1 | 5/2018 | Pursifull et al. | |

FOREIGN PATENT DOCUMENTS

| | | | |
|---|---|---|---|
| WO | 2015036575 A1 | 3/2015 | |
| WO | WO-2016037193 A1 * | 3/2016 | ............ G07C 5/006 |

* cited by examiner

SYSTEM AND METHODS FOR AUTOMATICALLY ON-BOARDING TELEMATICS UNITS IN VEHICLES

RELATED APPLICATIONS

This application is a continuation of U.S. patent application Ser. No. 18/097,709, entitled "System and Methods for Detecting Malfunctioning On-Board Telematics Units in Vehicles" filed Jan. 17, 2023, which is a continuation of U.S. patent application Ser. No. 17/343,834, entitled "Systems and Methods for Identifying Stock Anomalies in a Fleet Management System" filed Jun. 10, 2021, which is a continuation of U.S. patent application Ser. No. 16/480,553, entitled "System and Methods for Dynamic Creation of a Geofence for a Location" filed Jul. 24, 2019, which is a National Stage entry of PCT/EP2018/052073 filed on Jan. 29, 2018, which claims Foreign Priority to United Kingdom Application No. 1701390.5 filed Jan. 27, 2017, the entire contents of all of which are hereby incorporated by reference for all purposes.

FIELD

The present application relates to systems and methods for identifying and utilizing correlations between telematics data and data from a fleet management system. This correlation in combination with machine learning yields insights of interest and automated processes for reducing the operational expenditure of managing a fleet of vehicles.

BACKGROUND OF THE INVENTION

Telematics, in a broad sense, is any integrated use of telecommunications with information and communications technology. It is the technology of sending, receiving and storing information relating to remote objects, such as vehicles, via telecommunication devices.

Vehicle telematics can help improve the efficiency of an organization. Practical applications include fleet management. Fleet management is the management of a company's fleet of vehicles. Fleet management includes the management of motor vehicles such as cars, vans and trucks. Fleet (vehicle) Management can include a range of Fleet Management functions, such as vehicle financing, vehicle maintenance, vehicle telematics (tracking and diagnostics), driver management, fuel management, health and safety management and dynamic vehicle scheduling. Fleet Management is a function which allows companies which rely on transportation in their business to remove or minimize the risks associated with vehicle investment, improving efficiency, productivity and reducing their overall transportation costs, providing 100% compliance with government legislation and Duty of Care obligations. These functions can either be dealt with by an in-house Fleet Management department or an outsourced Fleet Management provider.

Employing telematics for a vehicle fleet usually involves the installation of an on-board unit in each automobile that communicates with the automobile controls, network and Telematics Service Provider (TSP) to provide Telematics features. This conventional architecture 100 is shown in FIG. 1. Vehicles 101 and 102 include respective on On-Board Units 104 and 105. The On-Board Units 104, 105 are installed in the vehicles 101, 102 to collect data from the vehicles and provide the data to the Telematics Service Provider 106. Any telecommunications network 107 (GSM, GPRS, Wi-Fi, WiMax, or L TE)) can be used to provide data the TSP 106.

As is known in the art, an OBU 104, 105 may include a global positioning system (GPS) unit, which keeps track of the latitude and longitude values of the vehicle; an external interface for mobile communication (GSM, GPRS, Wi-Fi, WiMax, or L TE), which provides the tracked values to a centralized geographical information system (GIS) database server; an electronic processing unit; a microcontroller, in some versions; a microprocessor or field programmable gate array (FPGA), which processes the information and acts on the interface between the GPS; a mobile communication unit; and some amount of memory for saving GPS values in case of mobile-free zones or to intelligently store information about the vehicle's sensor data.

Telematics is becoming particularly important to the rental vehicle industry. The Industry is changing due to the implementation of telematics at the core of rent-a-car companies. The trend started a few years ago in the U.S. and is now expanding to Europe and Latin America where the big players are deploying, or at least analyzing telematics as a driving force to increase efficiency and productivity. The benefits of telematics for the rent-a-car business can be split in to two main areas—benefits focused on efficiency and benefits focused on revenue generation.

The following is a list of some of the unnecessary costs incurred by the rental industry due to inefficiencies in fleet management:
  High insurance costs for rental companies.
    Unable to detect insurance fraud.
    Unable to detect drivers with poor driving records.
  Fleet check inefficiencies.
    Manually performing a fleet check is error prone.
    Costly in terms of time to perform fleet check and fix errors.
  Check in/out errors.
    Missed damage results in lost revenue.
    Wrong mileage leads to incorrect charges and poor customer experience.
    Inaccurate Fuel Charges.
  Vehicle Theft.
    Unable to detect vehicle theft until it is too late to recover.
  Increase utilization.
    Cut downtime and turnaround time.
    Reduce customer wait times.

In general, telematics opens a wide range of almost unlimited optimization opportunities for vehicle fleet management. In every vehicle fleet, regardless of size, there are many opportunities to control costs and reduce operational expenses. These opportunities can be identified using a combination of telematics data, rental data, business intelligence and big data analytics. Currently there are no solutions on the market that leverage telematics data, fleet management data and business intelligence to reduce the costs and improve the efficiency of managing a fleet of vehicles.

The present teachings address these deficiencies in the prior art.

SUMMARY

According to the present invention there is provided a method of creating a geofence for a first location comprising receiving a time that a first vehicle was at the first location from a fleet management system, receiving a time that the first vehicle was at a second location from an on-board telematics unit of the first vehicle, determining if the first vehicle was at the second location for a predetermined period of time before or after being at the first location, and creating the geofence for the first location as including the second location if it is determined that the first vehicle was at the second location for the predetermined period of time before or after being at the first location. The determining may comprise increasing a confidence level of the second location being within the geofence of the first location if the first vehicle was at the second location for a predetermined period of time before or after being at the first location.

Optionally, creating the geofence for the first location as including the second location occurs when the confidence level reaches a predetermined threshold.

The method may further comprise maintaining the confidence level of the second location being within the geofence of the first location as unchanged if the first vehicle was stationary at the second location for less than the predetermined period of time.

Optionally, a confidence level that a third location is part of the geofence is decreased if the first vehicle has not remained at the third location for a predetermined duration of time within a predetermined window of time.

The method may involve the third location being removed from the geofence if the confidence level that a third location is part of the geofence has decreased below a predetermined threshold.

The method may further comprise receiving a time that a second vehicle was at the first location from a fleet management system, receiving a time that the second vehicle was at the second location from an on-board telematics unit of the second vehicle, determining if the second vehicle was at the second location for a predetermined period of time before or after being at the first location, and increasing the confidence level of the second location being within the geofence of the first location if the second vehicle was at the second location for a predetermined period of time before or after being at the first location.

Optionally, the first vehicle and the second vehicle are different vehicles. Alternatively, the first vehicle and the second vehicle are the same vehicle.

Optionally, the first location and the second location are the same location. Alternatively, the first location and the second location are different locations.

The method may further comprise receiving a user input adding a location to the geofence.

The method may further comprise receiving a user input deleting a location from the geofence.

Optionally, the fleet management system is vehicle rental system.

Optionally, the location of the first vehicle and/or second vehicle is periodically received from the respective on-board telematics unit.

Optionally, receiving a time that a first vehicle was at the first location from a fleet management system occurs when a rental contract is opened for the vehicle by the fleet management system.

Optionally, receiving a time that a first vehicle was at the first location from a fleet management system occurs when a rental contract is closed for the vehicle by the fleet management system.

The present teachings also relate to a computer readable medium having stored thereon a program, which when executed by a computer, performs the above outlined method of creating a geofence for a first location.

A system configured to perform the above outlined method of creating a geofence for a first location is also envisaged.

According to the present invention there is also provided a method of associating an on-board telematics unit with a vehicle comprising receiving time and location data for the vehicle from a fleet management system, receiving time and location data for the on-board telematics unit from the on-board telematics unit, comparing the time and location data for the vehicle with the time and location data for the on-board unit to determine if they correspond, and associating the on-board telematics unit with the vehicle if it is determined that there is correspondence between the time and location data for the vehicle and the time and location data for the on-board unit.

The aforementioned comparing may comprise increasing a confidence level that the on-board telematics unit is associated with the vehicle if it is determined that a time and location of the vehicle corresponds to a time and location of the on-board unit correspond.

The comparing step may also comprise decreasing the confidence level if it is determined that a time and location of the vehicle does not correspond to a time and location of the on-board unit.

The method may further comprise associating the on-board telematics unit with the vehicle if the confidence level reaches a predetermined threshold. The predetermined threshold may be a predetermined integer.

Optionally, associating the on-board telematics unit with the vehicle comprises disassociating the on-board telematics unit with a second vehicle.

Disassociating the on-board telematics unit with a second vehicle may comprises, comparing time and location data for the second vehicle with time and location data for the on-board unit to determine if they correspond, and disassociating the on-board telematics unit with the second vehicle if it is determined that there is not correspondence between the time and location data for the second vehicle and the time and location data for the on-board unit.

Optionally, associating the on-board telematics unit with the vehicle may comprise processing all telematics data from the on-board telematics unit as indicating a time and location of the vehicle.

Increasing the confidence level may involve increasing the level by a factor of one. Decreasing the confidence level may comprise decreasing the level by a factor of one.

Optionally, the time and location of the vehicle is received from a fleet management system when an electronic record is created for the vehicle on the fleet management system.

Receiving time and location data for the vehicle from the fleet management system may comprise receiving a vehicle identification number for the vehicle.

Receiving the time and location for the on-board telematics unit from the onboard telematics unit may comprise receiving an identification number for the onboard telematics unit.

Optionally, receiving a time and location of the on-board telematics unit from the on-board telematics unit occurs periodically.

According to the present invention there is also provided a system configured to perform the above outlined method of associating an on-board telematics unit with a vehicle.

A computer readable medium having stored thereon a program, which when executed by a computer, performs the above outlined method of associating an onboard telematics unit with a vehicle is also envisaged.

The present teachings also describe a method for detecting a malfunction of an on-board telematics unit associated with a vehicle, this method may comprise the steps of receiving time and location information from a fleet management system, identifying the vehicle at a first location at a first time, receiving time and location information from a fleet management system identifying the vehicle at a second location at a second time, and logging a malfunction of the on-board telematics unit if it is determined that time and position data has not been received from the unit between the first time and the second time.

The method of any one of claims further comprising sending a notification of the malfunction to the fleet management system if it is determined that time and position data has not been received from the unit between the first time and the second time.

The method according to claim 1 further comprising sending an instruction to the on-board telematics unit to take a remedial action if it is determined that time and position data has not been received from the unit between the first time and the second time Optionally, the remedial action comprises at least one of updating the on-board unit, upgrading the on-board unit, resetting the on-board unit and restarting the onboard unit.

The method may further comprise sending a notification to the fleet management system if it is determined that position data has not been received from the on board unit a predetermined time after sending the instruction to the onboard telematics unit to take a remedial action.

The method may further comprise sending an instruction to take an alternative remedial action if it is determined that position data has not been received from the on board unit a predetermined time after sending the instruction to the on-board telematics unit to take the original remedial action.

The first location and second location may be the same location. Alternatively, the first and second location may be different locations.

The receiving time and location information from a fleet management system may occur when the vehicle is assigned a task. The task may be the assignment of the vehicle to a rental contract.

The receiving time and location information from a fleet management system may occur when an assignment of a vehicle to a task is completed. For example, when a rental contract for the vehicle is closed or terminated.

According to the present invention there is also provided a system configured to perform the above outlined method of detecting a malfunction of an on-board telematics unit.

A computer readable medium having stored thereon a program, which when executed by a computer, performs the above outlined method of detecting a malfunction of an on-board telematics unit is also envisaged.

According to the present teachings there is also provided a method for maintaining a vehicle stock report for a first location, the vehicle stock report listing all vehicles that are associated with the first location, the method comprising receiving an assignment of a vehicle from a fleet management system, determining from the assignment of the vehicle that the vehicle should be within a predetermined geofence a predetermined time after assignment of the vehicle, receiving a time and location of the vehicle from an on board unit of the vehicle, determining if the location of the vehicle is within the predetermined geofence within the predetermined time, and updating the stock report based on the result of determining if the location of the vehicle is within the predetermined geofence within the predetermined time.

Optionally, the time and location of the vehicle is received periodically from the on board unit.

Optionally, updating the stock report comprises recording the vehicle location as inconsistent with the predetermined geofence if the location of the vehicle is not within the predetermined geofence within the predetermined time.

Optionally, updating the stock report comprises recording the vehicle location as consistent with the predetermined geofence if the location of the vehicle is within the predetermined geofence within the predetermined time.

The method may further comprise updating the stock report with the predetermined geofence for the vehicle when the geofence for the vehicle is determined from the assignment.

The method may further comprise updating the stock report with the time and location of the vehicle when the time and location are received from the on board unit of the vehicle.

Optionally, the first location is within the predetermined geofence. Alternatively, the first location is outside the predetermined geofence.

Optionally, the determining from the assignment of the vehicle comprises determining that the vehicle should be within a geofence associated with the first location a predetermined time after assignment of the vehicle.

Optionally, determining from the assignment of the vehicle comprises determining that the vehicle should be within a geofence not associated with the first location a predetermined time after assignment of the vehicle.

The received assignment of the vehicle may indicate that a rental contract has been opened for the vehicle. Alternatively, the received assignment of the vehicle may indicate that a rental contract has been closed for the vehicle.

The method may further comprise outputting the stock report to a graphical user interface.

Optionally, determining if the location of the vehicle is within the predetermined geofence within the predetermined time is performed periodically.

According to the present invention there is also provided a system configured to perform the above outlined method of maintaining a vehicle stock report for a first location.

A computer readable medium having stored thereon a program, which when executed by a computer, performs the above outlined method of maintaining a vehicle stock report for a first location is also envisaged.

The present teachings also relate to a method for detecting vehicle theft or an unauthorized movement, the method may comprise the steps of receiving vehicle information from a fleet management system, the information identifying a geofence.

associated with the vehicle and whether the vehicle has been assigned to a task, receiving a time and location of the vehicle from an on-board telematics unit, generating a theft alert signal if it is determined that the vehicle is outside the geofence and has not been assigned to a task.

Optionally, the vehicle information is received from a fleet management system each time that the vehicle is assigned to task.

The vehicle information may also be received from a fleet management system each time that the assignment of a vehicle ends such that it is not assigned to a task.

The assignment of a task to a vehicle may be the opening of a rental contract corresponding to the vehicle. Any number of alternative tasks are envisaged. For example, the vehicle could be assigned to be cleaned or could be assigned to have a mechanical inspection.

The termination of the assignment of a task may be the closing of a rental contract for a vehicle.

According to the present invention there is also provided a system configured to perform the above outlined method of detecting vehicle theft.

A computer readable medium having stored thereon a program, which when executed by a computer, performs the above outlined method of detecting vehicle theft is also envisaged.

BRIEF DESCRIPTION OF THE DRAWINGS

The present application will now be described with reference to the accompanying drawings in which.

DETAILED DESCRIPTION OF THE DRAWINGS

Figure 1:
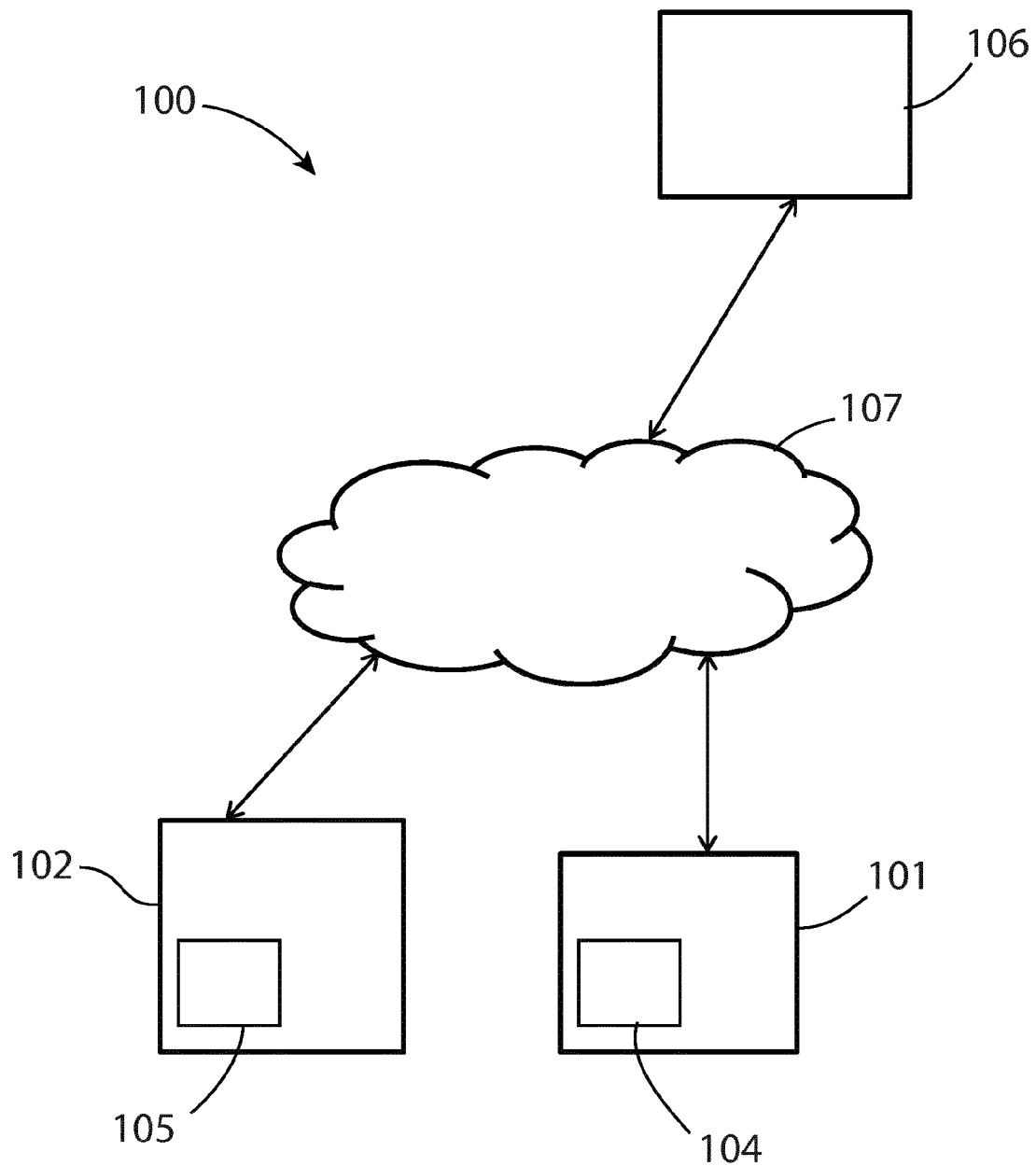
FIG. 1 is a block diagram of a conventional architecture for a vehicle telematics system.
Figure 2:
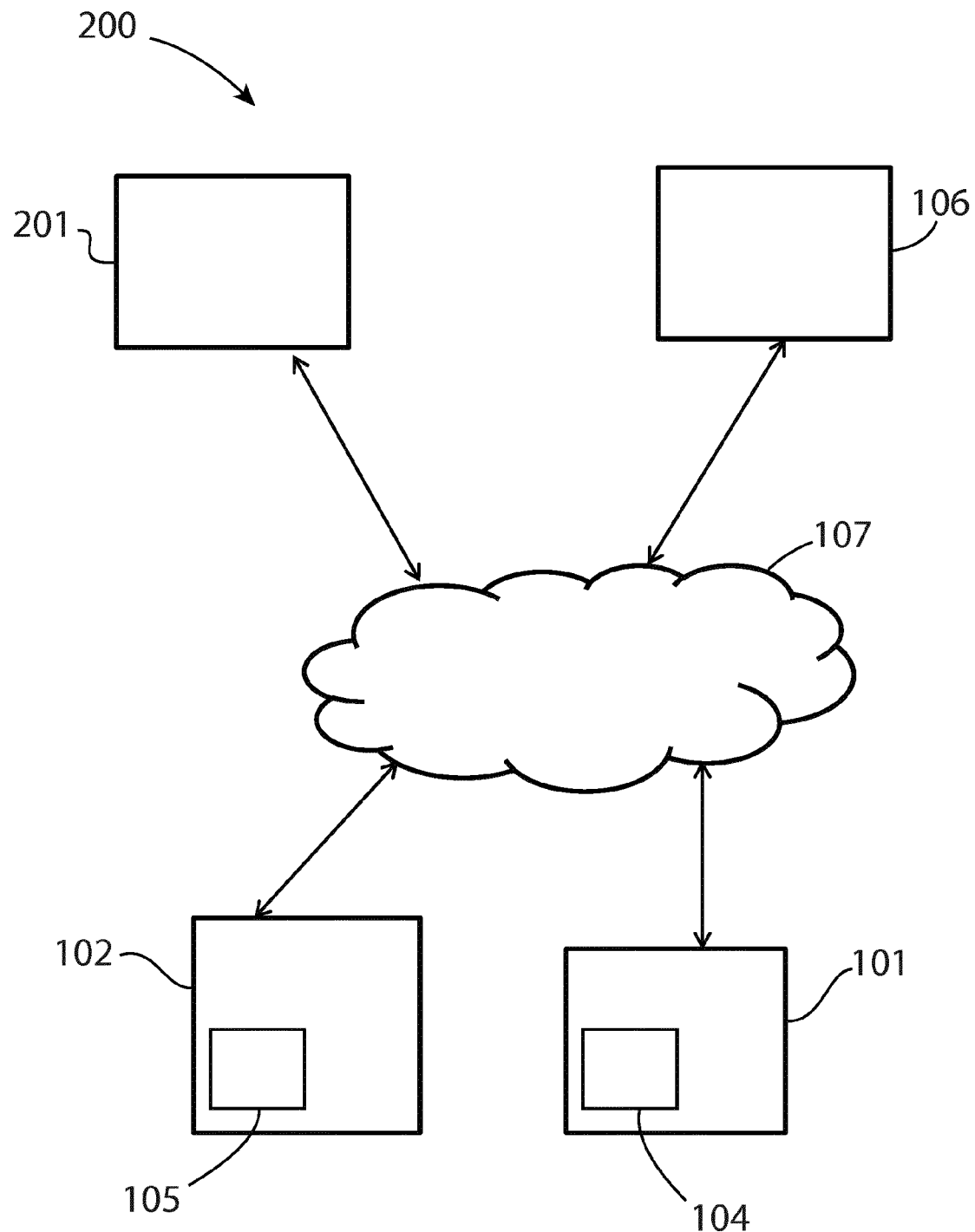
FIG. 2 is a block diagram of a system employing telematics data and fleet management data in accordance with the present teachings.

The inventors of the invention in accordance with the present teachings have found that correlating fleet management data with telematics data results in benefits in management of a fleet of vehicles. The architecture 200 of the system in accordance with the present teachings in shown in FIG. 2. While this exemplary embodiment is described with reference to a vehicle rental system, it will be appreciated that any vehicle management system may be used. This architecture differs from the conventional system of FIG. 1 in that a rental or leasing system 201 is provided, which can communicate with and provide data to the TSP 106. As will be explained in more detail hereinafter, data from the rental or leasing system (RLS) 201 and data from the Telematics Service Provider (TSP) system 106 is correlated or analysed to provide improved vehicle fleet management.

The rental and leasing data which is analysed and used by the present teachings (i.e., the data provided by the RLS 201) includes but is not limited to:
Customer/driver data.
  Name, date of birth, address, driving license number, phone number and nationality.
Vehicle data.
  Unique vehicle ID, registration, make, model, version, color, due off date, due off kilometers, supplier, category and status.
Rental or lease data.
  Contract number, current location, due back location, date time out, date time return, driver id, customer name, color, due off date, due off kilometers, supplier, category and status.
Non-revenue movement (NRM) data.
  Unique number, movement type, location out, location due back, date out, date back, supplier name, drivers name, registration, driver phone number and reason.

The telematics data which is correlated by the present teachings (i.e., the data provided by the TSP 106) includes but is not limited to:
Vehicle speed.
Vehicle acceleration.
Vehicle position.
Impact data and analysis.
Driver safety scores.
OBD diagnostic information.
Driver infotainment service usage data.

A first embodiment in accordance with the present teachings of correlating rental data and telematics data will now be described with reference to FIG. 3. As is known in the art, several manual tasks are required to set up and run a telematics system for a fleet management organization such as rental or leasing company. Firstly, when vehicles are added to a fleet, they need to have an OBU installed. After installing the OBU, a user needs to send the OBU device ID (IMEI) and vehicle license plate number (LPN) to the telematics system so it can determine which vehicle the OBU is tracking and sending data for. This process is known in the art as "onboarding".

There are a number of methods for "onboarding" a vehicle. The user may upload the relevant data using a variety of methods including submitting the data manually through an online form or taking a picture of the device IMEI and vehicle LPN/registration for upload. As this is a manual process, it is both error prone and time consuming to input. It is time consuming to fill out forms and upload data and it is error prone as a user could input the wrong data or upload the wrong image or a blurry image for a vehicle. Users providing incorrect inputs may result in data getting incorrectly processed and consequently incorrect insights or actions may be presented to the user.

An embodiment of the invention in accordance with the present teachings uses data correlation and machine learning to discover or determine IMEI-LPN associations i.e., OBU-vehicle associations. This embodiment of the present teachings removes the need for a user to provide any association input after installing a telematics device on a vehicle. The TSP 106 correlates the data from the rental or leasing software system 201 with the telematics data from the vehicles 101, 102 to learn the correct device-to-vehicle associations. Whenever a customer rents or leases a vehicle, a contract is opened on the rental software system 201. The data in a contract/record includes the LPN of the vehicle, the station ID (SID) of where the vehicle was rented/leased from and date/time that the rental or lease commenced. As is known in the art, an SID is a unique identifier for a key location in the rental or leasing system. For example a rental branch, pick up location, garage and bodyshop would all have SIDs. SIDs are used to track the locations of the vehicles in the fleet. It will be appreciated that in fleet management systems other than rental systems, a contract may not be opened. However, an electronic record containing essentially the same information as the contract may be created. For example, in haulage companies, a similar record as a contract may be opened each time a vehicle is assigned a (haulage) task. This is similar to the creation of non revenue movement (NRM) record for a rental system as will be explained in more detail below.

When a rental or leasing contract is closed, the LPN, the SID of the station to which the vehicle is returned and date/time of contract closure are all logged in the RLS 201. This data can also be correlated with the telematics data sent from the OBU 104, 105 in the vehicle to learn the vehicle-to-device associations.

When a rental or leasing contract is closed, the LPN, the SID of the station to which the vehicle is returned and date/time of contract closure are all logged in the RLS 201. This data can also be correlated with the telematics data sent from the OBU 104, 105 in the vehicle to learn the vehicle-to-device associations.

In addition, data from Non-revenue movement (NRM) can also be used by the TSP 106 to learn the association between an OBU and a vehicle. Whenever a NRM is recorded the date/time of the movement, the LPN and the SID of the start and end of movement are all recorded. The procedure for a NRM is similar to the rental procedure. However, instead of opening a contract for a customer, a NRM record is opened in system, which included similar data as in a rental contract i.e., the position of the vehicle (for which a NRM record is opened) at a particular time is stored the NRM record along with the above mentioned data.

Figure 3:
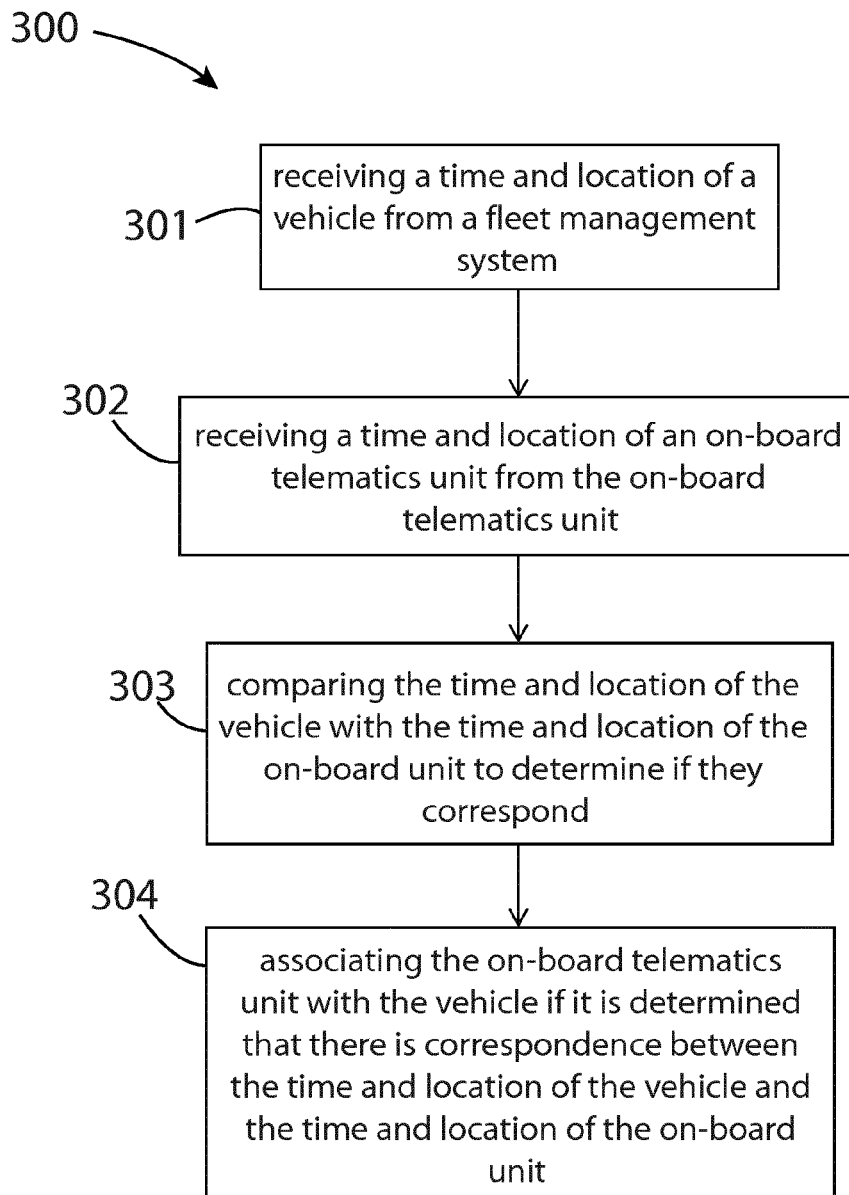
FIG. 3 is a flow diagram for a method of associating an on board telematics unit with a vehicle in accordance with the present teachings.

With reference to FIG. 3, the specific steps of the method 300 of associating an on-board telematics unit with a vehicle performed by the TSP 106 are outlined.

Step 301: receiving a time and location of a vehicle from a fleet management system.

Step 302: receiving a time and location of an on-board telematics unit from the on-board telematics unit.

Step 303: comparing the time and location of the vehicle with the time and location of the on-board unit to determine if they correspond.

Step 304: associating the on-board telematics unit with the vehicle if it is determined that there is correspondence between the time and location of the vehicle and the time and location of the on-board unit.

The OBU and the vehicle may be associated with each other if it is determined that time and location of the vehicle and the time and location of the on-board unit correspond a predetermined number of times. For example, if the vehicle and the on-board unit are at the same location three times within a certain time period, the OBU is considered to be installed in the vehicle and the vehicle and OBU are associated with each other.

Further steps of the method (not shown in FIG. 3) may include increasing a confidence level that the on-board telematics unit is associated with the vehicle if it is determined that the time and location of the vehicle corresponds to the time and location of the on-board unit correspond; and decreasing the confidence level if it is determined that the time and location of the vehicle with the time and location of the on-board unit do not correspond.

The process for learning associations can be further improved by adding a step to check if the difference in mileage recorded by the RLS at the time the rental or NRM movement is opened and closed is the same as the mileage recorded by the OBU.

Associating the on-board telematics unit with the rental vehicle may comprise processing all telematics data from the on-board telematics unit as indicating a time and location of the vehicle.

As will be explained in more detail below, associating the on-board telematics unit with the rental vehicle may comprise disassociating the on-board telematics unit with a second rental vehicle. That is, an on-board unit may already be (incorrectly) associated with a vehicle and the on-board unit must be disassociated from the incorrect vehicle before associating it with the correct vehicle.

Figure 4:
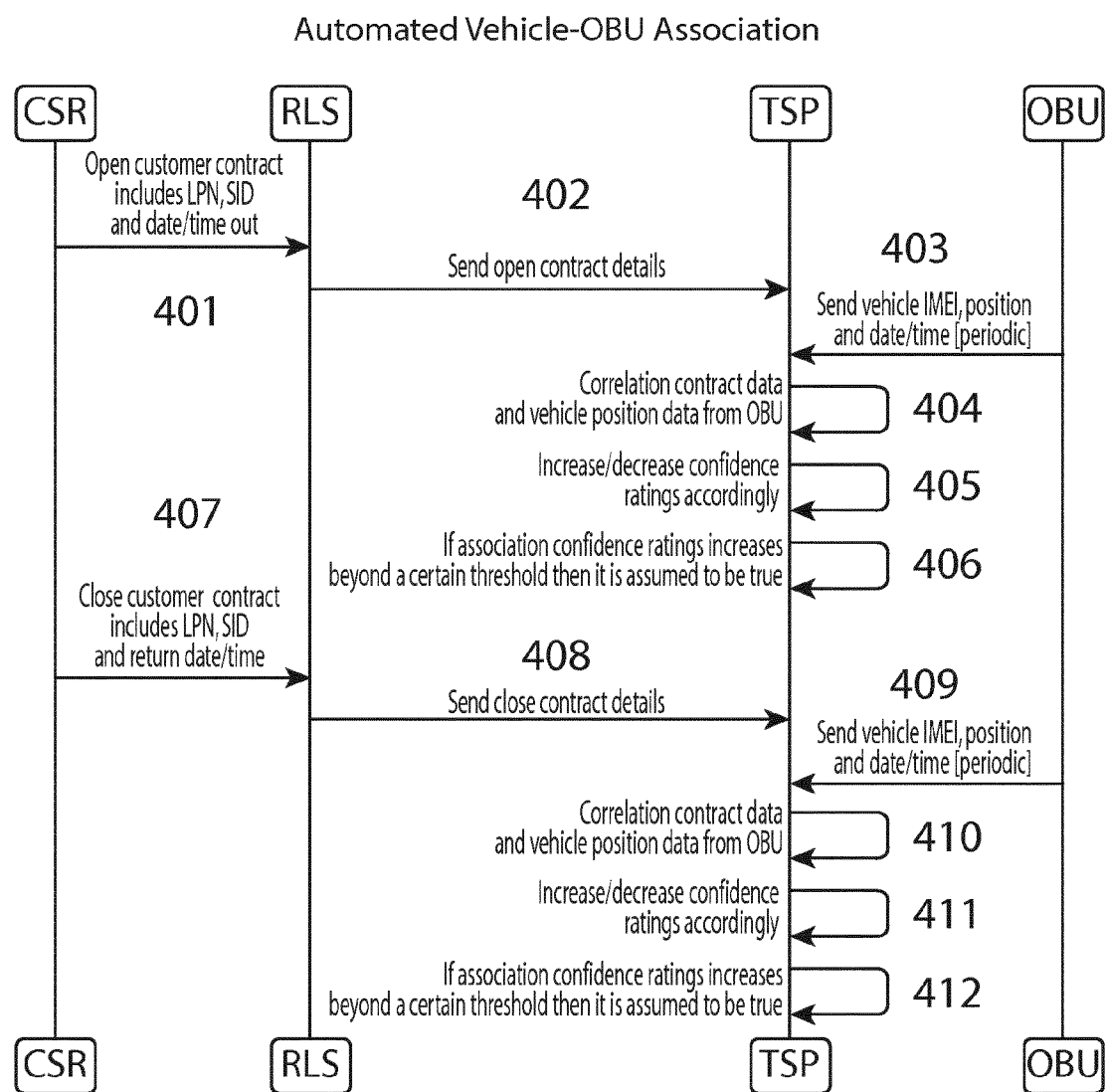
FIG. 4 is also a flow diagram for a method of associating an on board telematics unit with a vehicle in accordance with the present teachings.

The fully automated process for associating an on-board unit with a vehicle is described in more detail with reference to FIG. 4. While this exemplary embodiment is described with reference to a rental system, it will be appreciated that any fleet management system many be used.

At step 401, a customer service representative (CSR) inputs data to the rental system 201 e.g., at a user terminal in a vehicle rental office. The data entered each time a customer contract is opened includes the LPN of the vehicle being rented, the SID and the date/time that the vehicle is being rented from. At step 402, the data or contract details are provided to the TSP 106. The TSP is also provided with an OBU IMEI, position of the OBU and date/time corresponding to the position in step 403. This information is provided by the OBU 104, 105 periodically to the TSP 106. At this point in time, the TSP can receive information from the OBU but it has not associated the OBU with any particular vehicle in the fleet.

At step 404, the TSP 106 correlates the contract data received from the RLS 201 and the vehicle position data received from the OBU. At step 405, the TSP decides to increase or decrease a confidence rating that the OBU should be associated with the vehicle corresponding to the contract data. At step 406, if the confidence rating has increased above a predetermined threshold, the TSP associates the OBU with the vehicle identified in the contract data.

It will be appreciated that the predetermined threshold may be chosen as appropriate by the person skilled in the art. For example, the predetermined threshold may be a predetermined integer. In this scenario, increasing a confidence level comprises increasing the confidence level by a factor of one. Furthermore, decreasing the confidence level may comprise decreasing the level by a factor of one.

The teachings in accordance with the present disclosure can also use contract data obtained when a customer contract is closed (step 407) in order to associate an OBU with a vehicle. For example, an OBU may not have been associated with a vehicle by the time a contract for that vehicle is closed. However, using rental information obtained from closing the contract, an association may be made.

Steps 407-412 mirror previously described steps 401-406, respectively. At step 407, a customer service representative (CSR) inputs data to the rental system 201 e.g., at a user terminal in a vehicle rental office. The data entered each time a customer contract is closed includes the LPN of the vehicle being returned, the SID and the date/time that the vehicle is being returned to. At step 408, the data or contract details are provided to the TSP 106 i.e., time and location data for the vehicle is provided to the TSP. The TSP is also provided with an OBU IMEI, position of the OBU and date/time corresponding to the position in step 409. This information is provided by the OBU 104, 105 periodically to the TSP 106.

At step 410, the TSP 106 correlates the contract data received from the RLS 201 and the vehicle position data received from the OBU. At step 411, the TSP decides to increase or decrease a confidence rating that the OBU should be associated with the vehicle corresponding to the contract data. At step 412, if the confidence rating has increased above a predetermined threshold, the TSP associates the OBU with the vehicle identified in the contract data.

A specific example of using the method 300 of associating an OBU with a rental vehicle in accordance with the present teachings is outlined below:

Using the data from the rental system (e.g., data received in step 301), the TSP system learns that a vehicle with LPN L 1 has moved from location SID S1 at approx. time T1 to SID S2 at approx. time T2.

From the rental data—L 1: S1 (T1)→S2(T2).

Using telematics data from the OBU with IMEI 11 (e.g., received in step 302), the TSP system learns that 11 has moved from a geofenced area that matches the SIDs S1 at approx. time T1 and arrived at SID S2 at approx. time T2.

From the telematics data—11: S1 (T1)→S2(T2).

The TSP correlates this data and determines that L 1:11 are potentially associated as according to both datasets they moved to and from the same locations at roughly the same time. The TSP increases the confidence level of this association.

Increase confidence of L 1:11 association.

If a movement is recorded which is contrary to the assertion that L 1 and 11 are associated, then the confidence level of this association will be decreased.

When the confidence level of an association increases beyond a certain threshold then all processing performed by the TSP will assume the association to be true.

This system and method for associating an on-board telematics unit with a rental vehicle can be completely automatic or it can override a user inputted association. That is, in some scenarios, a user may have erroneously linked or associated an OBU with a specific vehicle when it should have been linked with a different vehicle. The present teachings provide a method of overriding or correcting this erroneous association.

Figure 5:
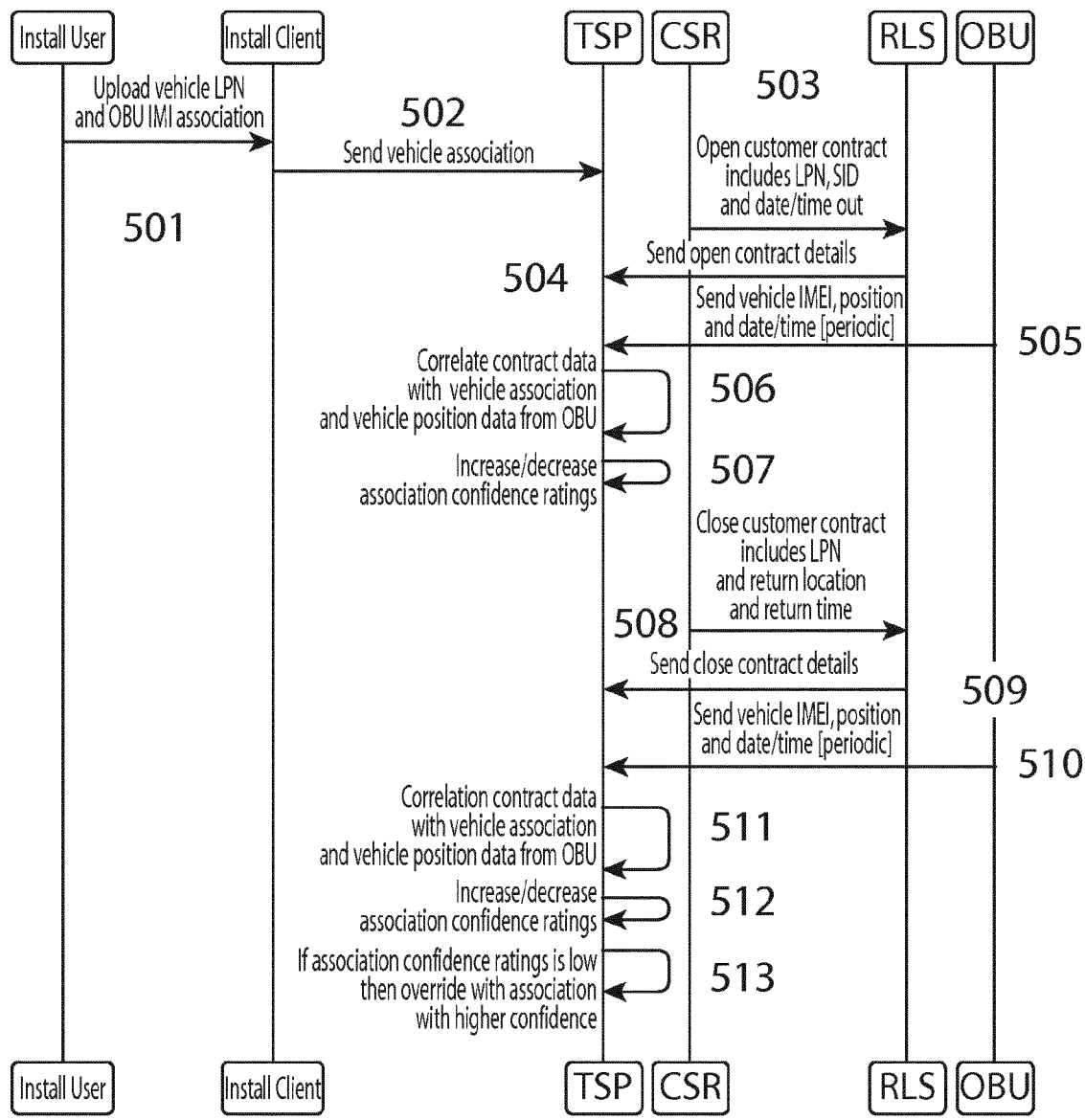
FIG. 5 is also a flow diagram for a method of associating an on board telematics unit with a vehicle in accordance with the present teachings.

The method for overriding or correcting a user inputted association between an OBU and a vehicle is now described with reference to FIG. 5. At step 501, a user (install user) communicates with a client (install client) to upload or input a vehicle license plate number (LPN) and OBU IMEI for association. For example, this could involve the installer of the OBU using an on-line web form (or a mobile app) to input/upload the LPN and OBU IMEI. It will be appreciated that any number of methods may be used by the user to associate the OBU with a vehicle in step 501. Furthermore, it will be appreciated that the step 501 carried out by a user is prone to human error.

At step 502, the association between an OBU and a vehicle as input/uploaded by a user is provided to a Telematics Service Provider (TSP), e.g., TSP 106. At step 503, a similar step as outlined in step 401 of FIG. 4 is carried out. That is, a customer service representative (CSR) inputs data to the rental system 201 e.g., at a user terminal in a vehicle rental office. The data entered each time a customer contract is opened includes the LPN of the vehicle being rented, the SID and the date/time that the vehicle is being rented from.

At steps 504, contract details such as the aforementioned LPN of the vehicle being rented, the SID and the date/time are provided to the TSP by the TLS. In step 505, the TSP is provided with an OBU IMEI, position of the OBU and date/time. At step 506, the TSP compares the time and location of the vehicle with the time and location of the on-board unit to determine if they correspond. At step 507, a confidence level that the on-board telematics unit is associated with the vehicle is increased or decreased based on the comparison. It is possible to make association at this point in time i.e., after step 507 if the confidence rating has reached a predetermined threshold. However, there are scenarios where further data is needed before an override can be performed (i.e., before the threshold can be reached) and the method proceeds to step 508.

At step 508, a customer representative closes the contract for the vehicle. At step 509, the RLS informs the TSP that the rental contract has been closed for the vehicle. In step 509, the TSP is also provided with the LPN of the vehicle being returned, the SID and the date/time that the vehicle is being returned to. At step 510, the OBU provides the TSP with an OBU IMEI, position of the OBU and date/time corresponding to the position.

At step 511, the position and time data received from OBU and RLS are compared or analyzed. At step 512, the confidence level is raised or lowered as appropriate (as previously described). For example, the confidence level that current association between an on board unit and a vehicle may be lowered and the confidence level of an association of the on board unit with another vehicle may be increased.

At step 513, if the TSP determines that the confidence level of the current association is below a predetermined threshold and the confidence level of another association is above a predetermined threshold, the current association is overridden.

A detailed example of overriding or correcting an association between an OBU and a vehicle is outlined below:

User inputs an association of vehicle with LPN L 1 to the OBU with IMEI 11. This association is sent and stored in the TSP system.

(From user input—L 1:11 association).

Using the data from the rental system, the TSP system learns that the vehicle with LPN L 1 has moved from location SID S1 to SID S3.

(From the rental data—L 1: S1→S3).

At the same time using the data from the OBU with IMEI 11, the TSP system also learns that according the telematics data it has moved from a geofenced area that matches the SIDs S1 and S2.

(From the telematics data—11: S1→S2).

All three assertions above cannot be true:

Vehicle with LPN L 1 is associated with OBU with IMEI 11 (From user input—L 1:11 association).

Vehicle with LPN L 1 has moved from SID S1 to S3 (From the rental data—L 1: S1→S3).

OBU with IMEI 11 has moved from SID S1 to S2 (From the telematics data—11: S1→S2).

The TSP now decreases the confidence level of this association.

(Reduce confidence of L 1:11 association).

At the same time, the TSP system also learns that the vehicle with LPN L2 has moved from location S3 to S4 according to the rental system data (L2: S1→S2).

This correlates to the movement of OBU with IMEI 11.
The TSP now increases the confidence of this association. (Increase confidence of L2:11 association).
The TSP increases the confidence level of an association as the number of correlation matches increases for that association (i.e. rental system data and telematics data agree).
The TSP decreases the confidence level of an association as the number of correlation mismatches increases for that association.
When the confidence level of an association that disagrees with a user's input increases beyond a certain threshold then this association overrides the user's input association.

As will be appreciated by the person skilled in the art, vehicles in a rental fleet have a short turnaround and are on-fleeted (added to the rental flee) and off-fleeted (removed from the rental fleet) frequently so it is important to automate and streamline the process for associating an OBU with a vehicle. The above outlined embodiment in accordance with the present teachings completely automates the onboarding process using data correlation and machine learning. Implementing this system and method means that a user is no longer required to input and send this onboarding data to the TSP. This reduces the onboarding time, the risk of error and the time taken to resolve these errors.

Another time-consuming process required when setting up a telematics system is the creation of geofences. As is known in the art, a geofence is a virtual perimeter for a real-world geographic area. Geofencing is the process of creating virtual boundaries around a location of interest. For a rental or leasing company, the locations of interest include branch offices, mechanics, body shops, holding areas and tire shops. It will be appreciated by the person skilled in the art that a rental/leasing company/system is merely exemplary and any vehicle fleet management system with corresponding locations of interest may be used. Once a geofence has been created for a location of interest, alerts are generated whenever vehicles enter and exit the boundaries of the geofence.

The process of creating a geofence is time consuming and error prone. For example, if a user of a fleet management system wants to create a geofence around a location, the process involves navigating a map on a graphical interface to find the location and then drawing a shape around the location of interest to specify its coordinates. Currently setting up geofences for locations of interest is a manual process. Users need to draw the boundary of a geofence on a map using a shape (e.g. polygon, square, circle or free form). For a typical medium sized rental company this could require drawing hundreds of geofences i.e., one for each location of interest. As this is a manual and error prone process, a geofence may have to be redrawn several times after weeks of testing to ensure its accuracy.

This embodiment of the invention in accordance with the present teachings uses data correlation between telematics data and fleet management data to create appropriate geofence boundaries for a location. This embodiment of the present teachings removes the need for a user to create geofences manually. The Telematics Service Provider (TSP) correlates the data from fleet management or rental system with the telematics data from a vehicle(s) to learn and create the correct boundary for each geofence. Of course, a third party entity could also be tasked with taking the telematics data and fleet management data in order to create an appropriate geofence for each location of interest.

This embodiment of the invention can be used in conjunction with the previously described embodiment—associating an on-board telematics unit with a vehicle. Alternatively, this further embodiment can be used independently. That is, even if a manual process has been used to associate an OBU with a vehicle (and no override takes place), the method in accordance with the present embodiment of the present teachings can be used to create and/or edit a geofence.

In a similar manner as outlined above with regard to the previous embodiment, data from rental movement and Non-revenue movement (NRM) in conjunction with telematics data can be used to determine the location of vehicles. Whenever a rental contract or a NRM record is opened, a station identifier (SID) and a date/time is specified (e.g. SID="DUBT01" and time=09/11/2016 12:42:02). This SID is a "location of interest" for the rental company and therefore requires a geofence. The TSP automatically correlates this data (i.e. SID and date/time) with the position of that vehicle from the OBU at that time and applies machine learning rules. For example a rule could specify that if a vehicle is stationary in a position for a certain amount of time after a contract for that vehicle is closed or before a contract is open in a specific SID, then the TSP increases the confidence of that position being within the geofence of that SID. If the confidence rating goes above a certain threshold, then this position is included in the geofence. The confidence rating should only be increased if the vehicle is stationary for certain period to avoid adding positions of moving vehicles to the geofence. The more instances of correlation, the more the system learns and increases its confidence of the geographic and boundary points of the geofence. It will be appreciated that an electronic record at the fleet management system containing essentially the same information as for the contract record or NRM record may be used to implement the present teachings.

Figure 6:
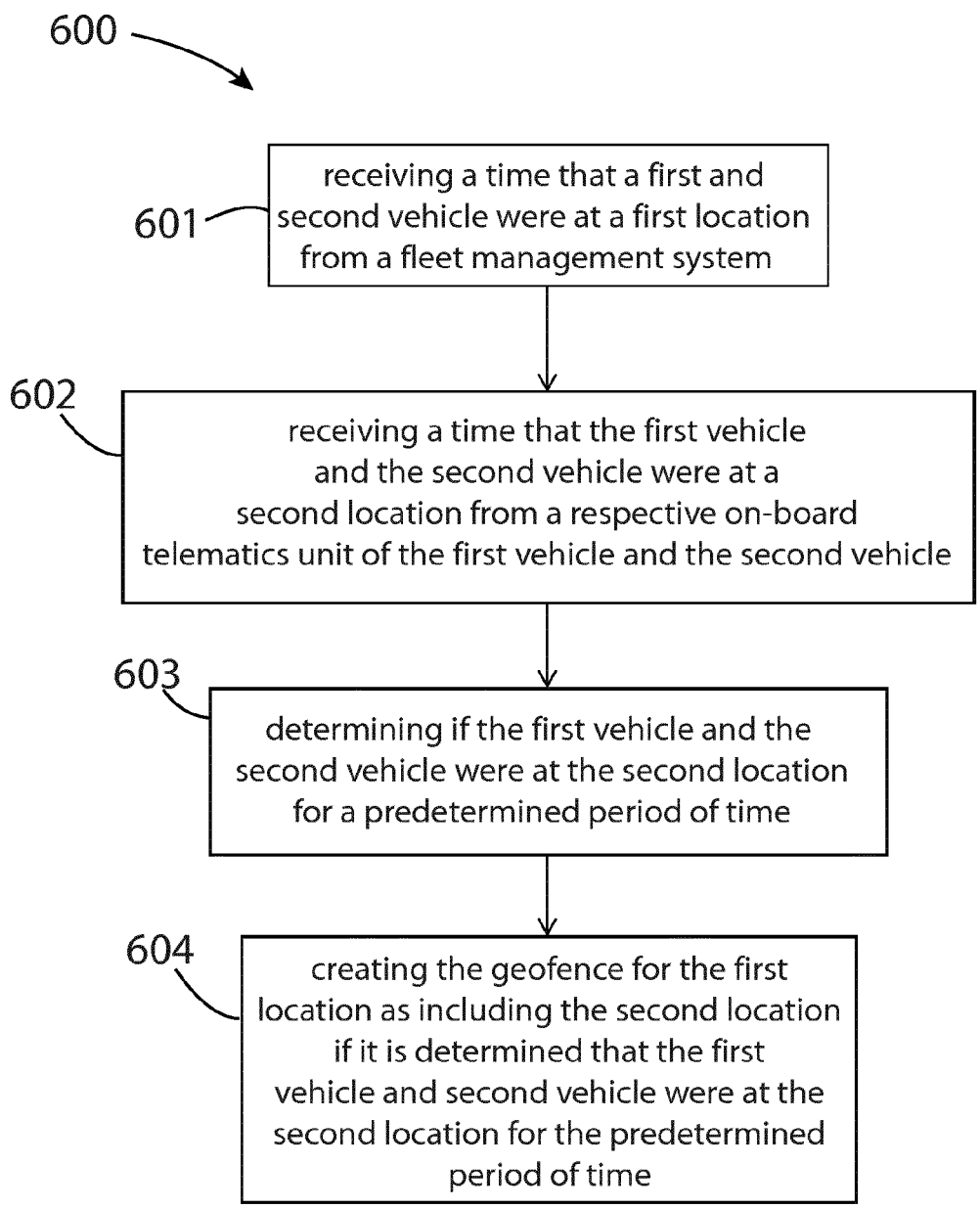
FIG. 6 is a flow diagram for a method of creating a geofence in accordance with the present teachings.

With reference to FIG. 6, the general steps of a method 600 of creating a geofence for a first location as performed by the TSP 106 are outlined. Although reference is made to a first and second vehicle, only one vehicle is required.

Step 601: receiving a time that a first vehicle and a second vehicle were at the first location from a fleet management system.

Step 602: receiving a time, a second location and duration that the first vehicle and the second vehicle were at a second location from a respective on-board telematics unit of the first vehicle and the second vehicle.

Step 603: determining if the first vehicle and the second vehicle were at the second location for a predetermined period of time.

Step 604: creating the geofence for the first location as including the second location if it is determined that the first vehicle and second vehicle were at the second location for the predetermined period of time.

The following rules for correlation and learning may be used to determine a geofence for rental location DUBT01. However, it will be appreciated that these rules are merely exemplary and any specific rules may be set as appropriate.

The rules for increasing the confidence level of a specific boundary being inside a geofence for a specific SID are as follows:

Vehicle has been stationary for more than 45 mins in one position prior to a contract opening (electronic record being created) for that vehicle.

Vehicle has been stationary for more than 45 mins in one position after a contract closing (electronic record closed) for that vehicle.

An exemplary rule for decreasing the confidence level of a specific area is as follows:

1. The position has not been occupied (vehicle stationary at that location) by a vehicle for more than 30 days.

User feedback on geofences can be used to fine tune these rules/parameters. For example, a user can validate a system learned geofence or independently draw their own geofence for the same SID. Based on this feedback the system can tune its rules or parameters above to improve its algorithm for learning geofences.

A method of creating a geofence for a location of interest may also be considered to include the following steps:
- Receive the longitude, latitude and time from the OBU of a vehicle.
- Check the fleet management system (FMS) data to determine if this vehicle was in any location of interests at the time reported by the OBU.
- If the FMS reports that the vehicle was inside a location of interest at this time and if the vehicle OBU longitude and latitude stays the same for a predetermined period of time then increase the confidence that the longitude and latitude is inside the location of interest.
- When confidence level of any longitude and latitude exceeds a predetermined threshold redraw geofence around this position.
- If the longitude or latitude is not reported by any OBU within a predetermined length of time then reduce the confidence level that this longitude and latitude is inside the location of interest.
- If the confidence level of this longitude and latitude goes below the predetermined threshold then redraw the geofence to not include this longitude and latitude.

Figure 7:
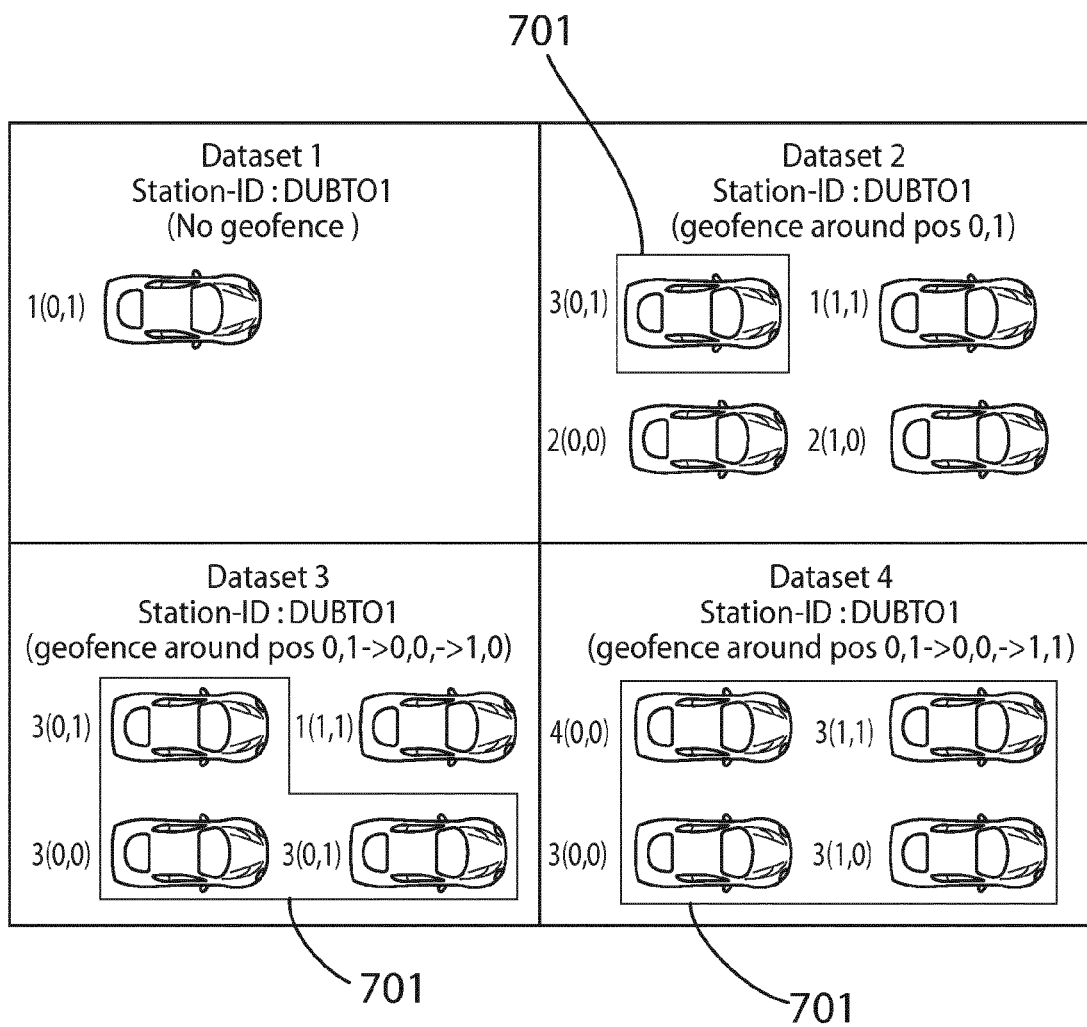
FIG. 7 is a diagram showing the creating of a geofence using a method in accordance with the present teachings.

Turning to FIG. 7, this figure shows a geofence being automatically created or drawn using data correlation and machine learning for SID DUBT01 and the exemplary rules given above. The numbers in the brackets are the X, Y position coordinate of the vehicle. These coordinates are kept simple for demonstration purposes only and are not indicative of real world coordinates. The number outside the bracket is the confidence level of the position (inside the brackets) being within the geofence.

Table 1 below shows the data events that would result in the geofence 701 of FIG. 7 being drawn/created given the exemplary machine learning rules outlined above. It can be seen that in the first dataset (Dataset 1), no geofence exists but as more data is gathered by the TSP, the geofence 701 is expanded. Although this exemplary embodiment is described with reference to a rental system, it will be appreciated that any vehicle fleet management system may be used. In such a system, a contract may not be opened but an electronic record including essentially the same information as provided in the contract would be opened or created.

TABLE 1

| Dataset | Rental Data (received from RLS 201) | Telematics Data (received from OBU 104.105) | Action | Confidence |
|---|---|---|---|---|
| 1 | Contract opened for vehicle A at 09:00 at SID DUBT01 | Vehicle A has been stationary in position 0, 1 for 3 hours prior to this (06:00-09:00) | Increase confidence rating of boundary around position 0, 1 by 1 | 1(0, 1) |

TABLE 1-continued

| Dataset | Rental Data (received from RLS 201) | Telematics Data (received from OBU 104.105) | Action | Confidence |
|---|---|---|---|---|
| 2 | Contract closed for vehicle B at 09:10 at SID DUBT01 | Vehicle B has been stationary in position 0, 1 for 2 hours after this (09:30-12:30) | Increase confidence rating of boundary around 0, 1 by 1 | 2(0, 1) |
| 2 | Contract closed for vehicle C at 09:20 at SID DUBT01 | Vehicle C has been stationary in position 2, 2 for a period of 15 mins after this (09:40-09:55) | Confidence levels remain the same as period threshold was not exceeded | 2(0, 1) |
| 2 | Contract opened for vehicle D at 09:25 at SID DUBT01 | Vehicle D has been stationary in position 0, 0 for 2 hours prior to this (06:25-09:25) | Increase confidence rating of boundary around 0, 0 to 1, | 1(0, 0) 2(0, 1) |
| 2 | Contract opened for vehicle E at 09:40 at SID DUBT01 | Vehicle E has been stationary in position 1, 1 for 1 hour prior to this (08:30-09:30) | Increase confidence rating of boundary around position 1, 1 by 1 | 1(0, 0) 2(0, 1) 1(1, 1) |
| 2 | Contract closed for vehicle F at 09:50 at SID DUBT01 | Vehicle F has been stationary in position 1, 0 for a period 3 hour 15 mins after this (10:00-13:15) | Increase confidence rating of boundary around 1, 0 by 1 | 1(0, 0) 2(0, 1) 1(1, 1) 1(1, 1) |
| 2 | Contract opened for vehicle G at 10:00 at SID DUBT01 | Vehicle G has been stationary in position 0, 0 for 4 hours prior to this (06:00-10:00) | Increase confidence rating of boundary around position 1, 0 by 1 | 2(0, 0) 2(0, 1) 1(1, 1) 1(1, 1) |
| 2 | Contract opened for vehicle H at 10:10 at SID DUBT01 | Vehicle H has been stationary in position 1, 0 for 2 hour 30 mins prior to this (07:50-10:10) | Increase confidence rating of boundary around position 1, 0 by 1 | 2(0, 0) 2(0, 1) 2(1, 0) 1(1, 1) |
| 2 | Contract closed for vehicle I at 10:20 at SID DUBT01 | Vehicle I was stationary in position 0, 1 for 2 hour 30 mins prior to this (07:50-10:10) | Increase confidence rating of boundary around position 1, 0 by 1. Draw a geofence for SID DUBT01 as it has exceeded confidence threshold | 2(0, 0) 3(0, 1) 2(1, 0) 1(1, 1) |
| 3 | Contract opened for vehicle J at 10:30 at SID DUBT01 | Vehicle J has been stationary in position 0, 0 for 1 hour 30 mins prior to this (09:00-10:30) | Increase confidence rating of boundary around position 0, 0 by 1. Draw a geofence for SID DUBT01 around 0, 0 and | 3(0, 0) 3(0, 1) 2(1, 0) 1(1, 1) |

TABLE 1-continued

| Dataset | Rental Data (received from RLS 201) | Telematics Data (received from OBU 104.105) | Action | Confidence |
|---|---|---|---|---|
| | | | 0.1 as both have exceeded confidence threshold | |
| 3 | Contract opened for vehicle K at 10:40 at SID DUBT01 | Vehicle K has been stationary in position 1, 0 for 2 hours prior to this (08:40-10:40) | Increase confidence rating of boundary around position 1, 0 by 1. Draw a geofence for SID DUBT01 around 0, 0, 0, 1 and 1, 0 as they have exceeded confidence threshold | 3(0, 0) 3(0, 1) 3(1, 0) 1(1, 1) |
| 4 | Contract opened for vehicle L at 10:45 at SID DUBT01 | Vehicle L has been stationary in position 1, 1 for 3 hours prior to this (07:45-10:45) | Increase confidence rating of boundary around position 1, 1 by 1 | 3(0, 0) 3(0, 1) 3(1, 0) 2(1, 1) |
| 4 | Contract closed for vehicle M at 11:00 at SID DUBT01 | Vehicle M was stationary in position 0, 0 for 2 hours prior to this (09:00-11:00) | Increase confidence rating of boundary around position 0, 0 by 1 | 4(0, 0) 3(0, 1) 3(1, 0) 2(1, 1) |
| 4 | Contract closed for vehicle N at 11:10 at SID DUBT01 | Vehicle N was stationary in position 1, 1 for 1 hour prior to this (10:10-11:10) | Increase confidence rating of boundary around position 1, 1 by 1. Draw a geofence for SID DUBT01 around 0, 0, 0, 1, 1, 0 and 1, 1 as they have all exceeded the confidence threshold | 4(0, 0) 3(0, 1) 3(1, 0) 3(1, 1) |

It will be appreciated from the above table 1 that although different vehicles are identified (vehicles A-N), a single vehicle (or single OBU) may be used to gather data in order to create a geofence for a location. However, the more data the telematics system receives from the rental system and telematics device (OBU) the more it learns about the shape of the geofence. Accordingly, if a plurality of vehicles are used, more data will be received in a shorter period of time.

Figure 8:
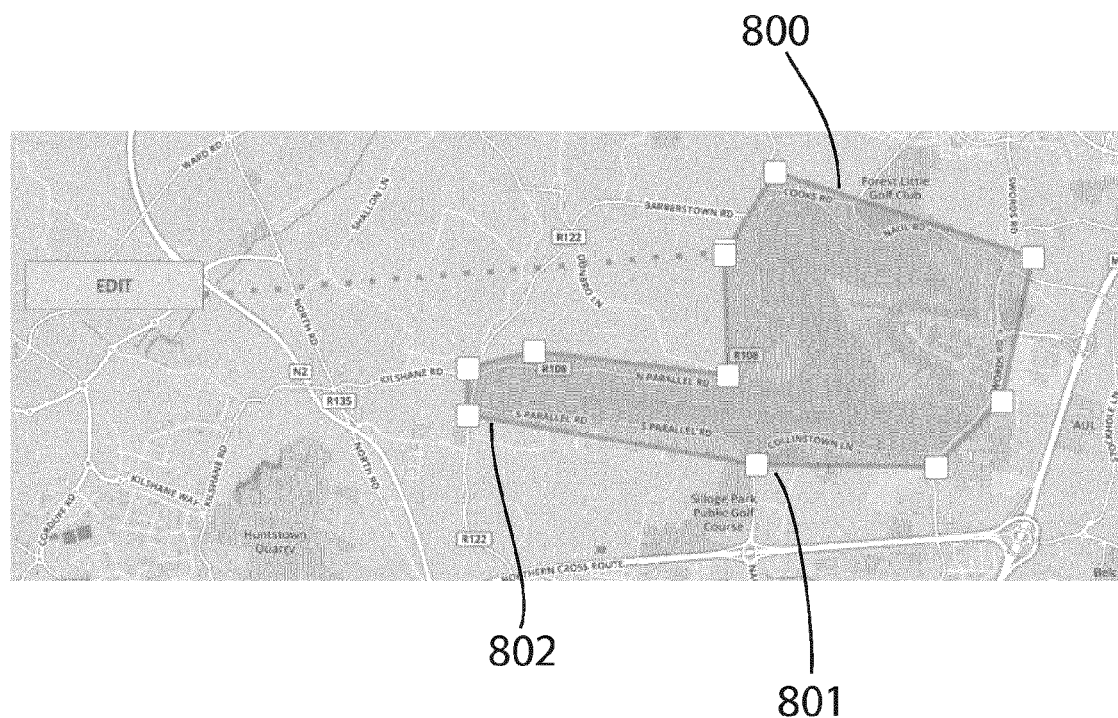
FIG. 8 is a diagram of a map showing an exemplary geofence for a location in accordance with the present teachings.

Turning to FIG. 8, a map showing an exemplary geofence for SID DUBT01. This geofence 800 contains a number of geographical positions 801, 802. For example, position 801 may have coordinates 0, 1 as described above, position 802 may have coordinates 1, 1. As is known to those skilled in the art, the geofenced area 800 is a relatively small area around a location SID DUBT01. Once a geofence has been created, alerts may be provided to the rental system each time the geofence 800 is crossed by a vehicle. For this example, the rental system will be made aware if a vehicle has arrived at SID DUBT01 (entered the geofenced area) or has left SID DUBT01 (left the geofenced area).

The same algorithm or method can be used to create geofences for the nonrevenue locations (SIDs) by correlating NRM data with telematics data and applying machine learning. As previously mentioned, a NRM record must be opened before a non-revenue movement can occur for a vehicle. When a NRM record is opened (and closed), similar information is recorded for the vehicle in question as for opening and closing a rental contract. Non-revenue SIDs include mechanical repair shops, electricians, interior trimers, body repairs shops, branches and trade shows/conference SIDs.

The learning algorithm can be tuned to discover sub-geofences within a geofence for given SID. For example, individual geofences corresponding to cleaning bays, returned parking bays and available parking bays may want to be created. Machine learning rules for determining these sub-geofences can be based on the knowledge that a car is usually first parked in a return parking bay, then it is moved in cleaning bay and then finally it is moved to an available parking bay. By analyzing stop/start patterns, movement and clustering of vehicle, the system can learn how to determine these sub-geofences within a SID. Again, a large dataset plus user feedback can help tune the parameters of these algorithms to improve the identification of these geofences and sub-geofences.

For example, the creation of a sub-geofence may first involve the creation of a geofence for a location as described. The location and time that a vehicle(s) spends at a specific location e.g., return bay etc. after a contract is closed for the vehicle is stored. It will quickly become apparent that a vehicle usually spends a predetermined amount of time at each of the first, second, third etc. location within the created geofence after being returned to a rental location or station. A subgeofence can be assigned for these first, second, third etc. locations.

It will be appreciated by those skilled in the art that the above outlined embodiment for created geofences by correlating location and time data results in an advantageous system and method. The method is fully automated such that creating geofences for locations of interest for a vehicle fleet system is no longer a time consuming task that must be performed by a user. This reduces the installation time, the risk of error and the time taken to resolve these errors.

Another embodiment of the teachings in accordance with the present disclosure involves a method of correlating data from a fleet management system with telematics data to perform automated stock checks.

Another time-consuming process that must be performed by a fleet management company is stock taking and maintaining a stock report. Performing stock checks in a rental location or depot usually requires a member of staff to walk around the location and take note of each vehicle present. The staff member must then compare these vehicles against the same data in the fleet management system and manually fix any anomalies/discrepancies in the data.

This embodiment of the invention in accordance with the present teachings automates this stock taking process and consequently there is no longer a requirement for a staff member to perform this stock check. Specifically, the TSP correlates the data from the fleet management system with the telematics data to determine discrepancies in the system. Furthermore, these discrepancies can be automatically amended or corrected. The method in accordance with the present teachings can identify any discrepancies between locations recorded by staff members in the system compared to the location data provided by the OBU fitted to a vehicle.

There are two methods for identifying and amending errors in the system.

Batch identification and manual amendments.

This type of identification is either triggered by a user or a scheduled task.

This involves a process comparing the telematics data and rental data for a specific group of vehicles in the database and generating a report.

A user can then use this report to manually amend the rental system.

1. Event-driven identification and automated amendment.

This type of identification is triggered by telematics events and rental events.

A telematics event is an update from the OBU and a rental event is a rental or NRM update from the RLS.

Both systems and methods automate the stock taking process so a member of staff is no longer required to take note of every vehicle in their compound and compare the data against the recorded data in the rental system.

Table 2 below is a batch (anomaly) report that is generated which shows all the stock anomalies for vehicles currently located in OUBT01. Generation of the report may be triggered by a user of the TSP system at the rental location, compound etc. The process compares the rental system data to the telematics system data and reports all the instances where they do not agree.

A stock anomaly may also result from a vehicle crossing a geofence it does not have permission to enter. For example, if there is a cross (international) border charge and the rental company does not allow vehicles to cross borders or the renter has not paid the fee to cross the border then the vehicle will show up on the stock anomaly report. Rules may be added to remove vehicles from the report if the cross-border activity did not meet a certain criterion. For example, if the vehicle crosses the border for only a brief amount of time or the vehicle only crossed the border by a small distance. The system can be extended to integrate with a banking system to automatically charge renters that show up in the report as a cross border stock anomaly. The rental contract is updated by the system to reflect that they have been automatically charged for the cross border fee.

This aspect of the invention may involve receiving fleet management data from a fleet management system e.g., contract details indicating that a fee to cross an international border has not been paid. The telematics system can assign or note a geofence for the vehicle in question e.g., geofence Ireland. The telematics system received geolocation data from an OBU of the vehicle. If it is determined that the vehicle has left the assigned geofence (Ireland), an alert can be sent to the fleet management system. The fleet management system can take the appropriate action as outlined above, charge a fee etc.

TABLE 2

| UNIQUE ID | REGISTRATION | CATEGORY | BRAND | MODEL | COLOUR | LOCATION | VEHICLE STATUS | GEOFENCE |
|---|---|---|---|---|---|---|---|---|
| 23406 | 161D44749 | IFMD | HYUNDAI | TUSCON | WHITE | DUBT01 | AVAILABLE | KNOCK AIRPORT |
| 23065 | 161D41511 | CDAD | RENAULT | CAPTUR 1.5 DSL AUTO | ORANGE | DUBT01 | AVAILABLE | DOWNEY'S FORD |
| 22474 | 161D39735 | IDMD | VOLKSWAGEN | PASSAT 1.6TDI | SILVER | DUBT01 | AVAILABLE | ATHLONE AFPC01 |
| 14526 | 142D15265 | CDMD | FORD | FOCUS 1.6 TDCI | BLACK | CORK ORKT01 | AVAILABLE | DUBT01 |
| 17850 | 151D36447 | CDMD | HYUNDAI | 130 1.6 DSL | WHITE | CORK ORKT01 | AVAILABLE | DUBT01 |

The report has identified the following anomalies:

1. 161044749—Hyundai—Tucson.
   It is located at OUBT01 according to rental system.
   It is located at KNOCKAIRPORT according to the telematics system/OBU.
2. 161041511—Renault—Captur 1.5 OSL Auto.
   It is located at OUBT01 according to rental system.
   It is located at DOWNEYS FORD according to the telematics system/OBU.
3. 161 D39735—Volkswagen—Passat 1.6TDI.
   It is located at DUBT01 according to rental system.
   It is located at DOWNEYS FORD according to the telematics system/OBU.
4. 142D15265—Ford—Focus 1.6TDCI.
   It is located at CORK ORK T01 according to the rental system.
   It is located at DUBT01 according to the telematics system/OBU.
5. 151D36447—Hyundai—i30 1.6 DSL.
   It is located at CORK ORK T01 according to the rental system.
   It is located at DUBT01 according to the telematics system/OBU.

In response to generating the report and observing the anomalies, a user can make manual amendments to the records to resolve these issues as outlined in more detail below.

It will be appreciated that this aspect of the invention can be performed separately from the stock anomaly detection aspect.

It will be appreciated that the present teachings provide a method for maintaining a vehicle stock report for a first location. The method may be performed by the telematics system using data received. The method comprising receiving an assignment of a vehicle from a fleet management system and determining from the assignment of the vehicle that the vehicle should be within a predetermined geofence a predetermined time after assignment of the vehicle. It will be appreciated that the assignment of the vehicle may correspond to opening a rental contract for the vehicle and providing it to a user. Alternatively, this could involve opening a NRM record or closing a contract or NRM record. In each case, the vehicle is expected to be within a specific geofence at a predetermined time after assignment of the task. If opening a contract, the geofence should be a geofence not associated with the station i.e., the vehicle is expected to leave the station as it has been rented by a customer. If closing a contract, the vehicle is expected to remain within the geofence of the station i.e., the vehicle has returned from a rental period. An assignment corresponding to non revenue movement (NRM) should also be associated with a geofence. For example, this may involve the vehicle being moved to another rental location, which means that the vehicle is expected to enter the geofence of the other rental location within a predetermined time.

The TSP system subsequently receives a time and location of the vehicle from an on board unit of the vehicle and determines if the vehicle is within the predetermined geofence at the predetermined time after assignment of the task based on the received time and location. The TSP updates the stock report based on the result of the determination. In a similar manner as previously described, the time and location of the vehicle may be received periodically from the on board unit.

Updating the stock report may comprise recording the vehicle location as inconsistent with the predetermined geofence if the location of the vehicle is not within the predetermined geofence within the predetermined time. Alternatively, updating the stock report comprises recording the vehicle location as consistent with the predetermined geofence if the location of the vehicle is within the predetermined geofence within the predetermined time.

Figure 9:
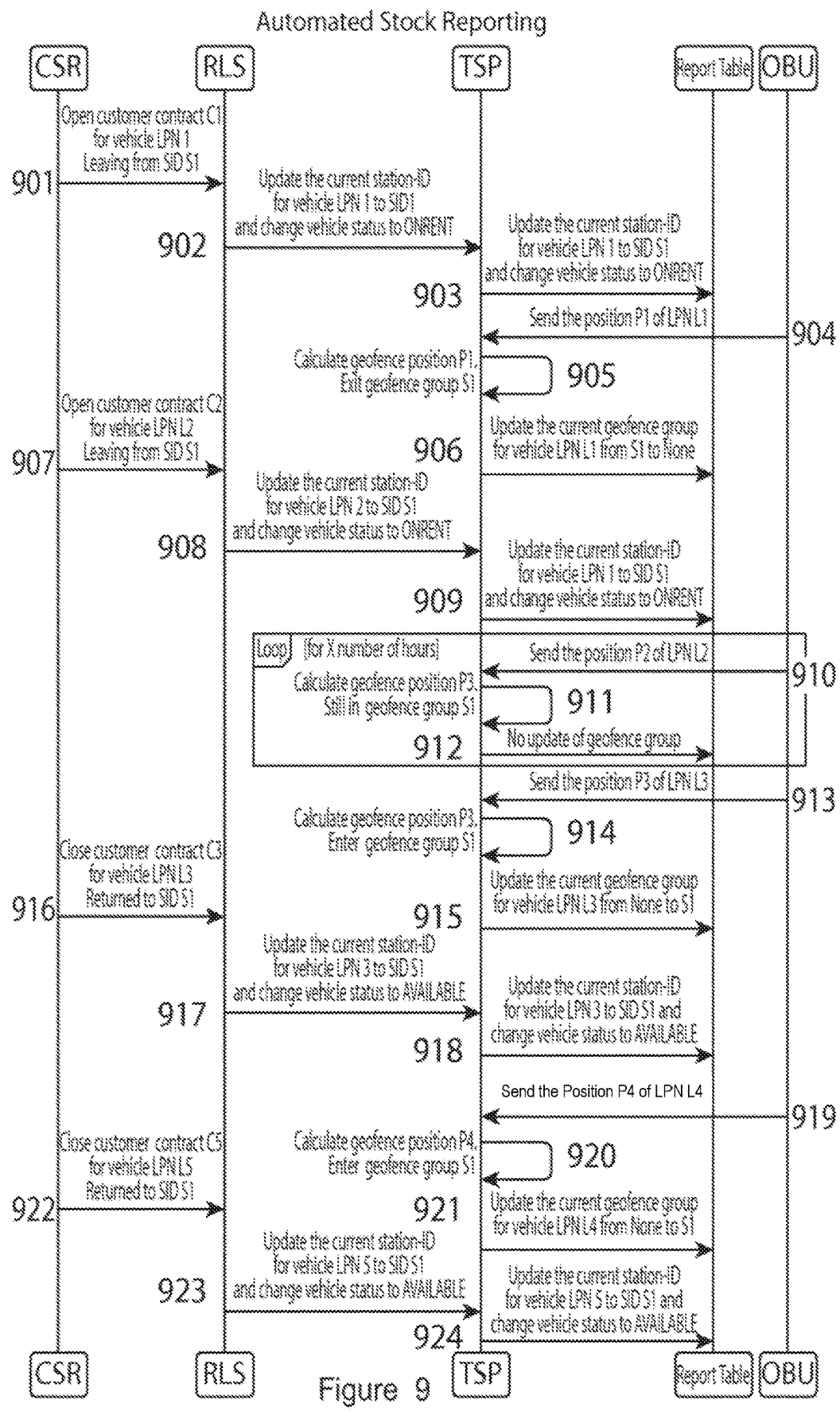
FIG. 9 is a flow diagram for a method of correlating fleet management data with telematics data in accordance with the present teachings.

A specific example of correlating rental or leasing data with telematics data to maintain a stock report for a location in accordance with the present teachings is now described with reference to FIG. 9. The skilled person will appreciate while the exemplary diagram of FIG. 9 is with respect to a vehicle rental system, the present teachings are not limited to this and any fleet management system may be used in place of the rental system RLS.

At step 901, the customer service representative (CSR) opens a contract C1 for License Plate Number (LPN) L 1 at station-ID S1. At step 902, the rental and leasing system (RLS) sends a notification to the Telematics Service Provider (TSP) system with these details. The TSP maintains a stock report and at step 903, the TSP uses the received details to update the stock report. Specifically, the Report Table is amended to specify that the status of the vehicle LPN L 1 has changed from AVAILABLE to ONRENT. The expectation is that the vehicle will leave the geofence S1 i.e., it will leave the station SID S1. The vehicle L 1 moves outside the S1 geofence. At step 904, the OBU sends a position update(s) for the vehicle L 1 to the TSP. It will be appreciated by the skilled person that the time and position data provided in step 904 may be provided periodically to the TSP. The TSP determines that the vehicle L 1 has moved outside the geofence S1 and is now outside all geofences—step 905. The TSP updates the Report Table for that vehicle to specify that the vehicle is now in the Ireland geofence—step 906. When a user generates a stock anomaly report, the TSP will compare the location of the vehicle (based on data received from the OBU) with the expected location corresponding to the status ON RENT. If this information corresponds or aligns, the location of vehicle L 1 will not be identified or recorded in the report table as a stock anomaly.

At step 907, a contract C2 is opened for vehicle L2 by a customer service representative CSR. At step 908, these contract/vehicle details are sent to the TSP. The TSP updates the report table to specify that the status of the vehicle L2 has changed from AVAILABLE to ONRENT—step 909. The vehicle is expected to leave the geofence S1. At step 910, the OBU sends a position update(s) for the vehicle L2 to the TSP. The TSP determines that the vehicle L2 is still inside the geofence S1—step 911. The TSP updates/maintains the report table with the location of the vehicle as within geofence S1—step 912. Steps 910 to 912 may be repeated periodically for a predetermined number time period e.g., a number of hours. The TSP will determine the time period since the vehicle was expected to leave the geofence S1 and if this time period exceeds a certain predetermined time threshold.

For example, it will determine that it has been 24 hours since the contract was opened and the threshold has been set at 4 hours. Accordingly, this vehicle L2 will be identified as an anomaly on the report. That is, if the stock anomaly report is run, the report will show that the location of the vehicle corresponding to the ON RENT status and actual location of the vehicle are not aligned.

If the vehicle is highlighted as an anomaly on the report, it is a sign that the CSR may have entered the wrong vehicle registration number into the contract or there was a change of vehicles but the contract was never updated to reflect this change.

At step 913, an OBU sends the position of a vehicle L3 to the TSP. The TSP determines that L3 has just entered the geofence S1—914. The TSP updates the stock report table to specify that the vehicle has changed geofence from none to S1—step 915. At step 916, a contract C3 is closed for vehicle L3 by a customer service representative CSR. At step 917, these contract/vehicle details are sent to the TSP. At step 918, the RLS sends the data to the TSP to specify that the RLS expects L3 now to be inside the geofence S1 i.e., the status is amended from ONRENT to AVAILABLE.

Now when the stock report is run, the TSP will read the report table and determine that the location of L3 is aligned between the telematics data and the data from the RLS. Accordingly vehicle L3 will not appear as an anomaly when the report is displayed to a user.

At step 919, the OBU for vehicle L4 sends the position of vehicle L4 to the TSP. The TSP determines the position of L4 and determines that it has just entered or crossed geofence S1—step 920. The TSP updates the stock report table to specify that the position of the vehicle L4 has changed Geofence from none to S1—step 921. However there is no corresponding contract closure for the vehicle L4 in the RLS so the vehicle is still expected to be outside S 1. If this vehicle remains in the return branch S1 without a contract closure for X number of hours (where X is a configurable threshold) then it will appear on the report as an anomaly.

At step 922 in FIG. 9, the CSR closes contract C5 for vehicle L5. The RLS updates the TSP specifying that the vehicle L5 should be inside the geofence S1—step 923. The TSP updates the stock report table specifying that location of L5 is S1—step 924. However there is no update from the OBU of the vehicle L5 placing it inside geofence S1 so the stock report still has its current geofence value or location which is none. When the stock report is run, the TSP will read the report table and determine that the location between the RLS and the tracker is not aligned so this vehicle will show up as an anomaly in the stock report.

It will be appreciated that a stock report can be requested at any time by a user. When this occurs the TLS reads the report table and displays the data in a suitable format.

Table 3 below shows the stock report for station S1 with respect to the above sequence diagram of FIG. 9. In the Table, the anomalies are included in rows L2, L4 and L5. This type of report could take between 5-6 hours if done manually as someone needs to walk around the branch compound or rental location checking each vehicle registration and comparing it to the location specified in the RLS.

TABLE 3

| LPN | Station-IP (RLS) | Geofence Group (Tracker) | Vehicle Status |
|-----|------------------|--------------------------|----------------|
| L1  | S1               | Ireland                  | ONRENT         |
| L2  | —                | S1                       | ONRENT         |
| L3  | S1               | S1                       | AVAILABLE      |
| L4  | S1               | Ireland                  | AVAILABLE      |
| L5  | —                | S1                       | ONRENT         |

There are three vehicles identified as anomalies in the table—L2, L4 and L5. L2 is identified as an anomaly due to its status being ONRENT and it still being inside the geofence group S1 beyond a configurable time threshold. The expectation is that if a vehicle's status changes to ONRENT that it will leave the geofence group S1 after a certain time. L4 is identified as an anomaly because the contract for this vehicle was closed at station S1 so the expectation is that the vehicle has returned to this geofence location. However, the OBU for this vehicle never gave a position update inside the geofence for this station. L5 shows up as an anomaly due to the contract for this vehicle remaining open so the expectation is that it will not cross the return station geofence. However, the OBU for this vehicle updates specifies that it has crossed the geofence a number of hours ago.

The following are some approaches to amending the above anomalies. The first approach is to verify the physical position of the vehicles highlighted visually. For example, for L2 a visual inspection of the branch S1 could be performed to see if the vehicle is there. If the vehicle is located at the branch the next step is to check when the vehicle was due back according to contract C2. If it was due back to that branch, the contract can be closed at the time the vehicle crossed the geofence which will correct this anomaly or discrepancy in the stock report. Such an anomaly is usually caused by a CSR not closing the contract when the vehicle was returned.

The L4 anomaly could be a potential theft so this needs to be reconciled promptly. According to the rental system there is currently no open contract for this vehicle so it should still be inside its return location (i.e. station S1). However according to the tracker it has left the geofence. This vehicle is currently outside all the rental stations, so the anomaly cannot be resolved through visually inspection of any of the stations. However it may be resolved by cross referencing other anomalies as explained below.

According to the rental system, vehicle L5 is currently out on rent on contract C5. However according to the tracker it has remained inside branch S1 for a number of hours. This can be confirmed through visual inspection of S 1. If it is inside the return station, then the user should check the times that L5 was due to go out on rent and check if any other vehicles have moved outside the geofence at that time that are not on contracts. Vehicle L4 left the compound at roughly that time so it is highly likely that L4 was supposed to be on the customer contract C5. This could be due to a CSR incorrectly inputting the wrong registration in the contract. Another way to confirm is by phoning the driver on contract C5 and ask them for the registration of their vehicle. Once this is confirmed, the user can change the registration on the contract which would fix both anomalies for L4 and L5.

The TLS could automatically provide suggestions for anomaly fixes. In the above example, the TSP could suggest that L4 is possibly out on contract C5 based on the movement of the vehicles and time that the contract was opened. It could also suggest that the contract for L2 should be closed because the vehicle crossed the geofence at roughly the time it was meant to be returned.

Figure 10:
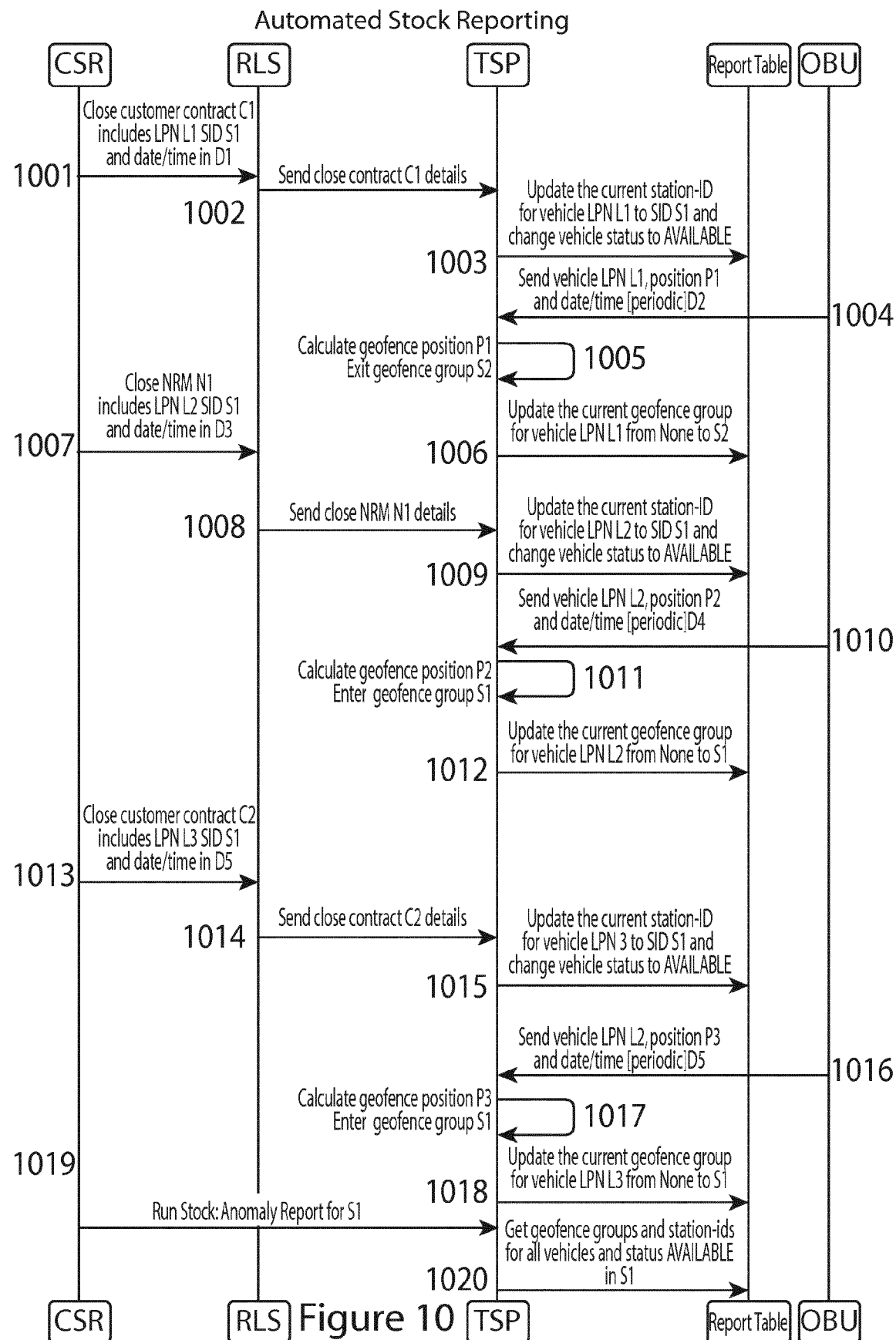
FIG. 10 is also a flow diagram for a method of correlating fleet management data with telematics data in accordance with the present teachings.

Another example of maintaining a vehicle stock report for a location is now described with reference to FIG. 10. Again, it will be appreciated by those skilled in the art that the method outlined in FIG. 10 is not limited to a rental system but can be utilized by any vehicle fleet management system in place of the RLS. In such a situation, the opening of a contract corresponds to an assignment of a vehicle to a task such as haulage from point A to point B with a start and end time. The closing of a contract is simply the assignment of a vehicle to another task, which may simply be to leave the vehicle parked in the station/depot.

At step 1001, a contract is closed for vehicle L 1. The details of the closing of the contract C1 such as license plate number, time, date and location are provided to the Telematics system TSP at step 1002. The TSP updates a Report Table with the status of the vehicle change from ONRENT to AVAILABLE and the location as SID S1—step 1003. At step 1004, the TSP receives time and position data from the OBU of vehicle L 1. In step 1005, the TSP determines that the vehicle is in geofence S2 based on the data received from the OBU. At step 1006, the Report Table is updated to show the geofence of the vehicle as S2. As will be explained in more detail below, this will be indicated as a discrepancy in the Report Table as the vehicle cannot be recorded as within geofence S1 by the rental system and within geofence S2 by the telematics system.

At step 1007, a NRM record for a vehicle L2 is closed and the details provided to the RLS at step 1008. At step 1009, the TSP updated the current station for vehicle L2 as S1 and changes the vehicle status to AVAILABLE. At step 1010, an OBU for vehicle L2 provides a position and location for L2 to the TSP. The TSP determines from the data received from the OBU that the vehicle L2 has entered geofence S1.

At step 1013, a contract is closed for vehicle L3. This information is passed to the TSP at step 1014. The TSP updated the report table at step 1015 with the station ID of the vehicle as S1 and the status as available. At step 1016, location data is received by the TSP from an OBU of the vehicle L3. The TSP determines that the vehicle is within geofence S1—step 1017. At step 1018, the report table is updated to reflect the geofence location of L3.

At step 1019, a CSR runs or requests a stock report for location/station S1 from the TSP. Accordingly the TSP accesses the maintained stock report (step 1020) and provides this to the user in graphical format. The flow diagram of FIG. 10 will generate the report for location S1 shown in Table 4 below.

TABLE 4

| LPN | Station-ID | Geofence Group | Vehicle Status |
|-----|------------|----------------|----------------|
| L1  | S1         | S2             | AVAILABLE      |
| L2  | S1         | S1             | AVAILABLE      |
| L3  | S1         | S1             | AVAILABLE      |

Vehicle L 1 is a discrepancy since the rental system believes that it is located at station S1 and that it is available to rent. However, the actual location as provided by the OBU of vehicle L 1 is within geofence S2. Of course, this assumes that the OBU is functioning correctly and provided accurate location data. This can be checked by manually determining the location of vehicle L 1.

Another embodiment of the teachings in accordance with the present disclosures involves a method of theft detection and unauthorized movement of vehicles. There are several approaches used by telematics systems to detect a stolen vehicle and unauthorized movement. One approach is to allow users to "arm" a vehicle. If the vehicle moves while the vehicle is armed then the user gets a notification that a potential theft has occurred. This is error prone as users may forget to arm the vehicle and users may find this manual task an inconvenience. The other approach is to draw or create a geofence around an area that the vehicle is usually located and if the vehicle leaves this geofence the user is notified of a possible theft. This is not a very accurate approach and can result in many false notifications.

Accordingly, this embodiment of the present teachings combines data from a fleet management system and telematics data to provide a higher level of confidence that a theft has occurred. The system correlates a live feed from the on-board unit (OBU) as well as information from a fleet management system. The OBU provides a vehicle position while the vehicle management system specifies whether a vehicle should be in a specific geofence or has moved for legitimate reasons (e.g. vehicle is out on rent, vehicle is currently on a non-revenue movement etc.).

A method for detecting vehicle theft in accordance with the present teachings may comprise the steps of receiving vehicle information from a fleet management system, the information identifying a geofence associated with the vehicle and whether the vehicle has been assigned to a task, receiving a time and location of the vehicle from an on-board telematics unit, sending a theft alert signal if it is determined that the vehicle is outside the geofence and has not been assigned to a task.

The skilled person will appreciate that the aforementioned task may be a haulage task assigned to a vehicle, renting of the vehicle to a user, assigning the vehicle to be cleaned etc.

Figure 11:
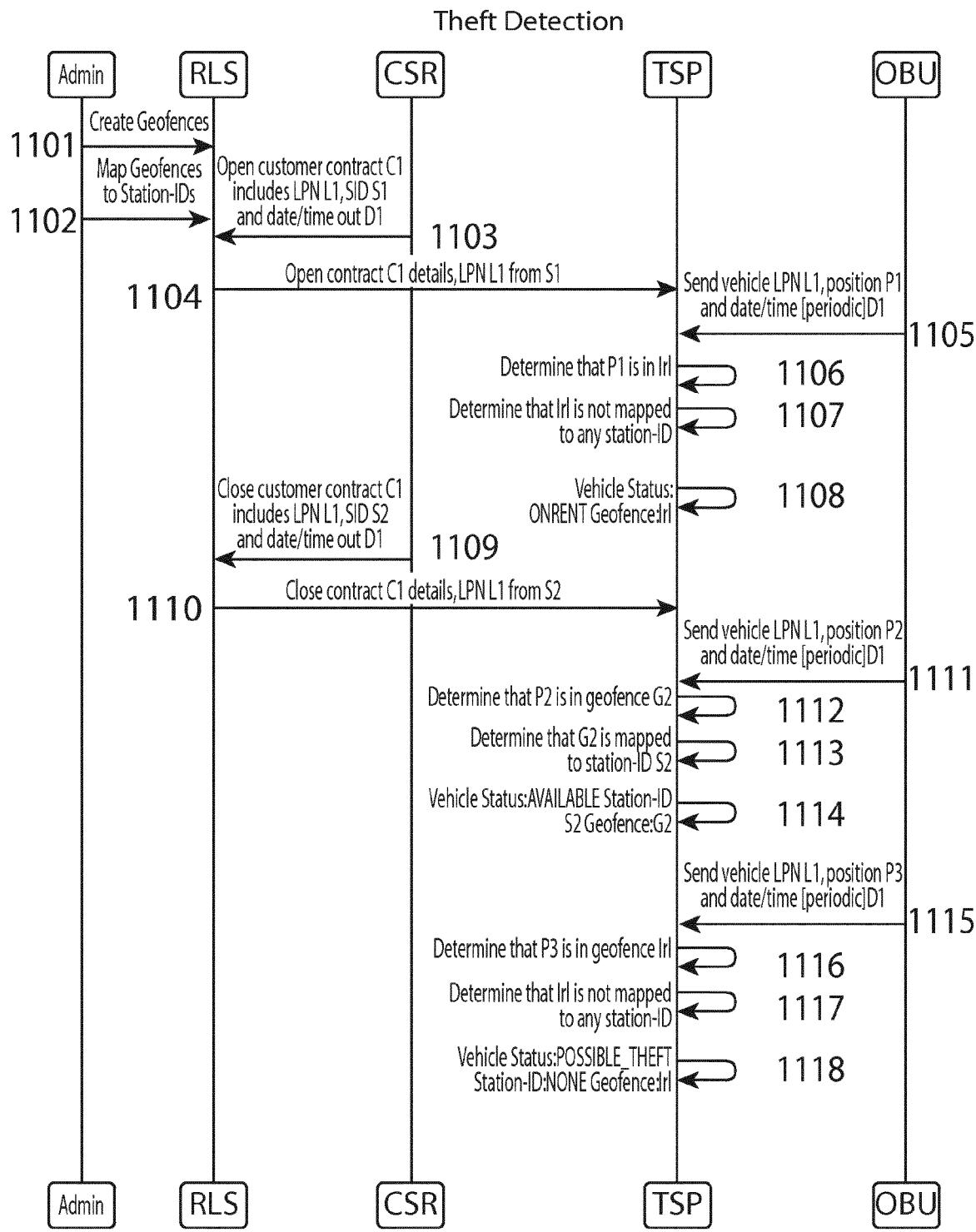
FIG. 11 is a flow diagram for a method of detecting vehicle theft employed in accordance with the present teachings.

A specific example of the method for detecting vehicle theft employed by the present teachings is shown in FIG. 11. The first step to improving the detection of theft is to create geofences for every location that a vehicle will be parked while not on rent or not on a NRM i.e., when not assigned a task. These include branch locations, repair shops etc. These geofences will then be mapped to station-ids in the rental system by the user. Every time a vehicle reports its position, the TSP will detect its geofence and station id. If this does not match the station-id in the rental system then the user will be alerted of a potential theft.

It will be appreciated that the method for theft detection in accordance with this embodiment of the invention is not limited to rental vehicles or rental systems. Any feet management may be used and can provide essentially the same information.

As provided by the rental system RLS. Geofences and stations IDs may be created for vehicle depots as opposed to rental locations. While a contract may not be opened, an electronic record equivalent to a contract may be created each time a vehicle is assigned to a task, user or movement.

The sequence diagram of FIG. 11 shows an exemplary work flow for theft detection in rental fleet. The skilled person will be aware that this method is equally applicable to any fleet management system. Firstly, an administrator creates geofences at step 1101 and maps them to all the station-ids in the rental system at step 1102. The specific method of creating geofences is not essential to this embodiment. This can be done manually by an administration or automatically as previously described with reference to FIGS. 6-8.

At step 1103, a customer service representative (CSR) opens a rental contract for a vehicle in a similar manner as previously described. At step 1104, the contract details including time and position and ID of the vehicle L 1 are provided to the telematics system (TSP).

At step 1105, the OBU (located in the vehicle) sends the position P1 for vehicle L 1 to the TSP. The TSP determines that the vehicle is inside Geofence lrl at step 1106. The TSP also determined that this geofence is not mapped to any station-ID—step 1107. The TSP correlates this data with the rental data received at step 1104 and determines that the vehicle is currently on an open rental contract (i.e. ON RENT)—step 1108. Therefore, the fact that the vehicle is not at a known station-id is not a reason to raise a "POSSIBLE_THEFT" alert. Specifically, the vehicle has been rented to a customer and is currently at a location that is not within the geofence of any station (rental location). The customer is free to drive the vehicle anywhere they please inside Geofence lrl.

At some point in time, the vehicle is returned to a rental location/station, in this case station S2. As shown in step 1109, the contract C1 is closed on return of the vehicle L 1 to the station S2. The close of contract details are provided to the TSP at step 1110.

The vehicle later sends an updated position P2 at step 1111. This position P2 is inside geofence G2 which is mapped to station-ID S2. At this point the vehicle is not on rent. The TSP determines that this is the expected location for the vehicle so no alert is triggered—steps 1112 to 1114.

At step 1115, the vehicle sends its location as P3. At step 1116, the TSP determines that P3 is inside geofence lrl and also determined at step 1117 that the geofence lrl not mapped to any known station-id. Since the vehicle is neither out on rent (or a NRM) but the vehicle is at a location not mapped to a station-id, this is determined to be a potential theft scenario and an alert signal is triggered—step 1118.

Although not described with reference to FIG. 11, another feature of the method for detect vehicle theft may involve receiving vehicle information from a fleet management system, the information identifying a task assigned to the vehicle and a geofence corresponding to the task, receiving a time and location of the vehicle from an on-board telematics unit, generating a theft alert signal if it is determined that the vehicle is outside the geofence corresponding to the task. For example, if a vehicle has been assigned to be mechanically inspected at a garage with a corresponding geofence but the telematics data indicated that it is not at the garage, this could indicate a theft.

Before an alert is generated, a predetermined period of time may be allowed to pass in which time and location of the vehicle from an on-board telematics unit is received. This is to allow for transit time between a rental location and garage.

FIG. 11, describes the method for detecting theft and unauthorized movement of vehicles at stations/branches, however it is unable to detect unauthorized movements that occur outside of branches (e.g. after customer delivery service). For added convenience, rental car companies provide a service whereby the rental vehicle is delivered to a customer's house or company before the start of the rental and collected at the end of the rental. If the rental vehicle is moved after the vehicle is delivered and before the contract commences then this is an unauthorized movement of the vehicle. This movement could either be the renter using the vehicle themselves in which case they should be billed for starting the contract early or it's a vehicle theft. In either case, rental companies do not have visibility of these unauthorized movements.

The following method describes how it can be detected. The delivery and collection drivers have a mobile application that allows them to manage their movements. At the beginning of a delivery movement they click a button to indicate the start of the delivery movement and they click a button when they complete the movement. The app transmits the time and location of the start and end of this delivery to the TSP service. It will be appreciated that any method of providing data to the rental and leasing system in place of a mobile application may be used.

If the OBU reports a movement of the vehicle after the transmitted end time of the deliver and before the start time of the rental contract, it adds an alert to the table. This alert can be sent as an email/SMS alert to a designated user or can be made part of an unauthorized movement report that is presented to user through a portal or email.

The user can take an action to contact the customer and verify whether they were responsible or whether it is a vehicle theft. This process is also applied to collection movements whereby the start and end location and time of collection movements are recorded in the mobile app. In addition, the location of the vehicle being collected is given to the driver through the app at all times during the collection. This reduces the number of occurrences of missed collections. A missed collection happens when the vehicle being collected is not at the agreed collection address at the agreed time of collection. The driver is notified as soon as the vehicle leaves the agreed location. In this case, the customer is charged a missed collection fee. This app allows missed collection to be identified early which reduces the overhead and lost fuel that results directly from these aborted collections.

The above method can be considered as comprising the steps of receiving vehicle information from a fleet management system indicating that a vehicle should remain at a location for a predetermined time period, receiving a notification that the vehicle has moved from the location within the predetermined time period from an on-board unit of the vehicle, generating an unauthorized movement alert if it is determined that the vehicle has moved within the predetermined time period.

These methods have many benefits including a reduction in theft, increase in revenue by billing customers for unauthorized usage of vehicles, increased transparency of delivery and collection movements, reduced fuel/mileage and an increase in overall improvement in efficiency as the central dispatcher can now manage all movements centrally.

Another embodiment of the teachings in accordance with the present disclosure involves a method of correlating data from a fleet management system with telematics data to enhance detection and recognition of issues with a vehicle OBU.

It is often difficult to determine if is there is a malfunction of an OBU using just the data from the OBU itself. For example, a telematics system may be configured with a rule to alert the administrator of a faulty OBU if the device does not report any journeys or does not report a change in position for a predetermined time period e.g., a number of days. However it may be a case that the vehicle is just parked in a location for that time and there is actually no issue with the device. Another rule for detecting issues with an OBU could be to report an issue with the device if a data packet has not been received from a device within a predetermined time frame e.g., a number of days. However, the vehicle may be parked in an underground car park with no signal and the OBU may be functioning correctly.

Machine learning can be used to determine the locations wherein a OBU signal cannot be sent and received. For example, if X number of vehicles lose signal in a specific location then the TSP will automatically create a geofence for this location as a known location that does not have a signal. If a vehicle OBU is no longer sending packets, the TSP will check if is inside such a geofences and if so will reduce the confidence level that the OBU is malfunctioning.

A geofence can be created for a signal "black spot" in a similar manner as described above for the creation of dynamic geofences. A log of all the areas in which a signal cannot be sent and/or received by an OBU may be created. This log can then be cross referenced periodically to determine if there are locations that repeatedly appear in the log. Using the geographical points at which a signal to/from an OBU is lost, the boundary of the geofence for the "black spot" can be determined.

A method for detecting a malfunction of an on-board telematics unit associated with a vehicle in accordance with the present teachings may comprise the steps of receiving time and location information from a fleet management system identifying the vehicle at a first location at a first time, receiving time and location information from a fleet management system identifying the vehicle at a second location at a second time, and logging a malfunction of the on-board telematics unit if it is determined that time and position data has not been received from the unit between the first time and the second time.

Figure 12:
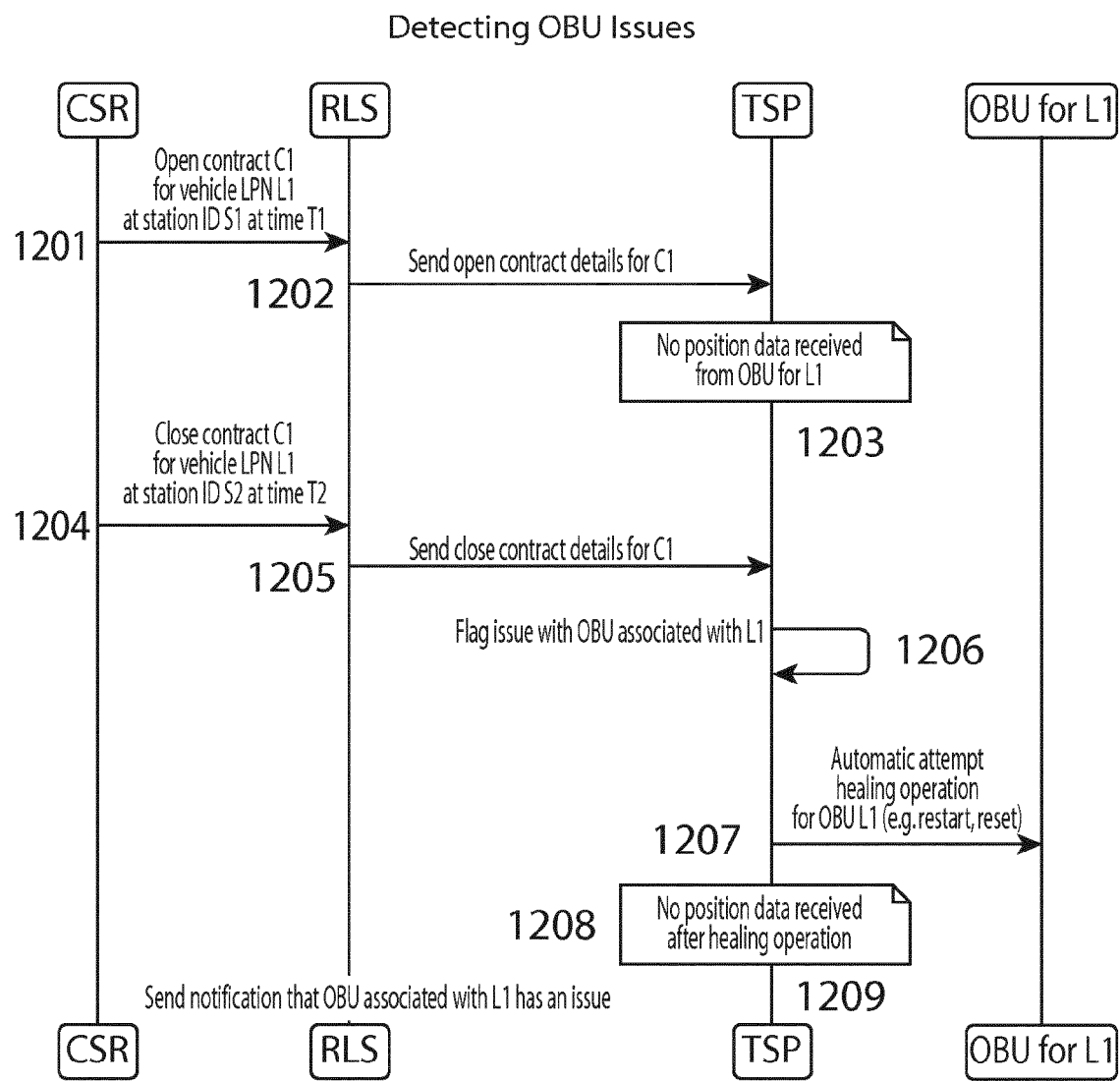
FIG. 12 is a flow diagram for a method for detecting an issue with an onboard unit of a vehicle in accordance with the present teachings.

By correlating the telematics data with the fleet management system or rental system data it is possible to make a more accurate prediction regarding device issues. A specific example of the method for detecting issue with an on-board unit of a vehicle is shown in FIG. 12. This example is described with reference to a rental system (RLS). However, the person skilled in the art will appreciate that any fleet management system may be used in place of the rental system RLS.

In step 1201, a contract for a vehicle L 1 is opened at station S1. At step 1202, the contract details are provided by the rental system to the telematics system.

Position data is not received from the OBU of the vehicle L 1—1203. At step 1204, the contract for the vehicle L 1 is closed at a different station S2. The closing of the contract is informed to the TSP at step 1205. Clearly there has been a movement of the vehicle from station S1 to S2 i.e., a movement has been (manually) recorded in the rental system (RLS) but no movement data has not provided to the telematics system by the OBU.

Once this miscorrelation in data from the RLS and OBU is detected (step 1206), the TSP will attempt to automatically resolve this issue with the OBU by instructing the device to update, upgrade, reset or restart—step 1207. Any number of remedial actions can be taken at this point. If these actions do not resolve the issue (step 1208) the rental system user will be instructed to manually inspect the device or send it for repair. That is, a notification is made by the TSP to the rental system RLS/user of the rental system that there is an issue with the OBU of vehicle L 1—step 1209.

It will be appreciated that the above description utilizing cross references between fleet management information and telematics information is made with reference to separate embodiments. However, this is not intended to convey the limitation that features or components that are described with reference to one embodiment cannot be used or interchanged for those described with reference to a second embodiment. All of the above embodiment can be combined partially or completely.

For example, an on-board unit may be associated with a vehicle and said vehicle and on-board unit subsequently used for the dynamic creation of a geofence(s).

A malfunction may be detected in an on-board unit that has been associated with a vehicle as outlined above. A malfunction may be detected (and corrected) in an on-board unit which has been (or is subsequently used) for the dynamic creation of a geofence.

The geofences used for maintaining a stock report and detecting vehicle theft may be created using the dynamic method of geofence creation described above.

It will be appreciated by those skilled in the art that the teachings in accordance with the present invention provide a number of benefits including the following:

Cut operational costs.
Complete fleet visibility.
Eliminate fraudulent claims.
Automated operational tasks.
  Automate stock taking.
  Automate check in/check out.
Intelligent reporting.
Vehicle location anomalies.
Valeting efficiency.
Vehicle maintenance reports.
Make faster and better decisions.
Impact detection.
Theft detection.
New products and services.
Customer driver safety portal.
Journey tracker/diary.
Locate where your car is parked.
Locate customer after breakdown.

The words comprises/comprising when used in this specification are to specify the presence of stated features, integers, steps or components but does not preclude the presence or addition of one or more other features, integers, steps, components or groups thereof.

What is claimed is:

1. A method of associating an on-board telematics unit with a vehicle, comprising:
    receiving a first time and location for a vehicle from a fleet management system;
    receiving a second time and location from an on-board telematics unit;
    comparing the received first time and location with the received second time and location to generate a comparison result; and
    determining whether to associate the on-board telematics unit with the vehicle based on the generated comparison result.

2. The method of claim 1, wherein receiving the first time and location for the vehicle from the fleet management system comprises receiving the first time and location for the vehicle from the fleet management system after a customer contract is closed.

3. The method of claim 1, wherein determining whether to associate the on-board telematics unit with the vehicle based on the generated comparison result further comprises:
    associating the on-board telematics unit with the vehicle in response to determining that the received first time and location corresponds to the received second time and location based on the generated comparison result.

4. The method of claim 1, further comprising:
    incrementing a correspondence value in response to determining that the received first time and location corresponds to the received second time and location based on the generated comparison result,
    wherein determining whether to associate the on-board telematics unit with the vehicle based on the generated comparison result further comprises associating the on-board telematics unit with the vehicle in response to determining that the correspondence value exceeds a threshold value.

5. The method of claim 1, further comprising:
    adjusting a confidence rating based on the comparison result,
    wherein determining whether to associate the on-board telematics unit with the vehicle based on the generated comparison result further comprises associating the on-board telematics unit with the vehicle in response to determining that the confidence rating exceeds a threshold value.

6. The method of claim 1, wherein determining whether to associate the on-board telematics unit with the vehicle based on the generated comparison result further comprises:
    determining a time period between a rental open time or a non-revenue movement (NRM) open time and a close time;
    determining a first mileage recorded by a rental or leasing system (RLS) within the determined time period;
    determining a second mileage recorded the on-board telematics unit during within the determined time period;
    determining a difference between the determined first mileage and the determined second mileage; and
    associating the on-board telematics unit with the vehicle in response to determining that the difference between the determined first mileage and the determined second mileage is less than a threshold value.

7. The method of claim 1, wherein determining whether to associate the on-board telematics unit with the vehicle based on the generated comparison result further comprises:
    disassociating the on-board telematics unit with a second vehicle in response to determining that the received first time and location corresponds to the received second time and location based on the generated comparison result.

8. The method of claim 1, wherein determining whether to associate the on-board telematics unit with the vehicle based on the generated comparison result further comprises:
    overriding a user-inputted association in response to determining that the received first time and location corresponds to the received second time and location based on the generated comparison result.

9. The method of claim 1, wherein receiving the first time and location for the vehicle from the fleet management system further comprises receiving a record identifying a rental status of the vehicle from the fleet management system.

10. A non-transitory computer readable storage medium having stored thereon processor-executable software instructions configured to cause a processor in a computing device to perform operations for associating an on-board telematics unit with a vehicle, the operations comprising:
    receiving a first time and location for a vehicle from a fleet management system;
    receiving a second time and location from an on-board telematics unit;
    comparing the received first time and location with the received second time and location to generate a comparison result; and determining whether to associate the on-board telematics unit with the vehicle based on the generated comparison result.

11. The non-transitory computer readable storage medium of claim 10, wherein the stored processor-executable instructions are configured to cause a processor to perform operations such that receiving the first time and location for the vehicle from the fleet management system comprises receiving the first time and location for the vehicle from the fleet management system after a customer contract is closed.

12. The non-transitory computer readable storage medium of claim 10, wherein the stored processor-executable instructions are configured to cause a processor to perform operations such that determining whether to associate the on-board telematics unit with the vehicle based on the generated comparison result further comprises:
associating the on-board telematics unit with the vehicle in response to determining that the received first time and location corresponds to the received second time and location based on the generated comparison result.

13. The non-transitory computer readable storage medium of claim 10, wherein the stored processor-executable instructions are configured to cause a processor to perform operations further comprising:
incrementing a correspondence value in response to determining that the received first time and location corresponds to the received second time and location based on the generated comparison result,
wherein determining whether to associate the on-board telematics unit with the vehicle based on the generated comparison result further comprises associating the on-board telematics unit with the vehicle in response to determining that the correspondence value exceeds a threshold value.

14. The non-transitory computer readable storage medium of claim 10, wherein the stored processor-executable instructions are configured to cause a processor to perform operations further comprising:
adjusting a confidence rating based on the comparison result,
wherein determining whether to associate the on-board telematics unit with the vehicle based on the generated comparison result further comprises associating the on-board telematics unit with the vehicle in response to determining that the confidence rating exceeds a threshold value.

15. The non-transitory computer readable storage medium of claim 10, wherein the stored processor-executable instructions are configured to cause a processor to perform operations such that determining whether to associate the on-board telematics unit with the vehicle based on the generated comparison result further comprises:
determining a time period between a rental open time or a non-revenue movement (NRM) open time and a close time;
determining a first mileage recorded by a rental or leasing system (RLS) within the determined time period;
determining a second mileage recorded the on-board telematics unit during within the determined time period;
determining a difference between the determined first mileage and the determined second mileage; and
associating the on-board telematics unit with the vehicle in response to determining that the difference between the determined first mileage and the determined second mileage is less than a threshold value.

16. The non-transitory computer readable storage medium of claim 10, wherein the stored processor-executable instructions are configured to cause a processor to perform operations such that determining whether to associate the on-board telematics unit with the vehicle based on the generated comparison result further comprises:
disassociating the on-board telematics unit with a second vehicle in response to determining that the received first time and location corresponds to the received second time and location based on the generated comparison result.

17. The non-transitory computer readable storage medium of claim 10, wherein the stored processor-executable instructions are configured to cause a processor to perform operations such that determining whether to associate the on-board telematics unit with the vehicle based on the generated comparison result further comprises:
overriding a user-inputted association in response to determining that the received first time and location corresponds to the received second time and location based on the generated comparison result.

18. The non-transitory computer readable storage medium of claim 10, wherein the stored processor-executable instructions are configured to cause a processor to perform operations such that receiving the first time and location for the vehicle from the fleet management system further comprises receiving a record identifying a rental status of the vehicle from the fleet management system.

19. A computing device, comprising:
a processor configured with processor-executable instructions to perform operations comprising:
receiving a first time and location for a vehicle from a fleet management system;
receiving a second time and location from an on-board telematics unit;
comparing the received first time and location with the received second time and location to generate a comparison result; and
determining whether to associate the on-board telematics unit with the vehicle based on the generated comparison result.

20. The computing device of claim 19, wherein the processor is configured with processor-executable instructions to perform operations such that receiving the first time and location for the vehicle from the fleet management system comprises receiving the first time and location for the vehicle from the fleet management system after a customer contract is closed.

21. The computing device of claim 19, wherein the processor is configured with processor-executable instructions to perform operations such that determining whether to associate the on-board telematics unit with the vehicle based on the generated comparison result further comprises:
associating the on-board telematics unit with the vehicle in response to determining that the received first time and location corresponds to the received second time and location based on the generated comparison result.

22. The computing device of claim 19, wherein the processor is configured with processor-executable instructions to perform operations further comprising:
incrementing a correspondence value in response to determining that the received first time and location corresponds to the received second time and location based on the generated comparison result,
wherein determining whether to associate the on-board telematics unit with the vehicle based on the generated comparison result further comprises associating the onboard telematics unit with the vehicle in response to determining that the correspondence value exceeds a threshold value.

23. The computing device of claim 19, wherein the processor is configured with processor-executable instructions to perform operations further comprising:
adjusting a confidence rating based on the comparison result,
wherein determining whether to associate the on-board telematics unit with the vehicle based on the generated comparison result further comprises associating the on-board telematics unit with the vehicle in response to determining that the confidence rating exceeds a threshold value.

24. The computing device of claim 19, wherein the processor is configured with processor-executable instructions to perform operations such that determining whether to associate the on-board telematics unit with the vehicle based on the generated comparison result further comprises:
determining a time period between a rental open time or a non-revenue movement (NRM) open time and a close time;
determining a first mileage recorded by a rental or leasing system (RLS) within the determined time period;
determining a second mileage recorded the on-board telematics unit during within the determined time period;
determining a difference between the determined first mileage and the determined second mileage; and
associating the on-board telematics unit with the vehicle in response to determining that the difference between the determined first mileage and the determined second mileage is less than a threshold value.

25. The computing device of claim 19, wherein the processor is configured with processor-executable instructions to perform operations such that determining whether to associate the on-board telematics unit with the vehicle based on the generated comparison result further comprises:
disassociating the on-board telematics unit with a second vehicle in response to determining that the received first time and location corresponds to the received second time and location based on the generated comparison result.

26. The computing device of claim 19, wherein the processor is configured with processor-executable instructions to perform operations such that determining whether to associate the on-board telematics unit with the vehicle based on the generated comparison result further comprises:
overriding a user-inputted association in response to determining that the received first time and location corresponds to the received second time and location based on the generated comparison result.

27. The computing device of claim 19, wherein the processor is configured with processor-executable instructions to perform operations such that receiving the first time and location for the vehicle from the fleet management system further comprises receiving a record identifying a rental status of the vehicle from the fleet management system.

* * * * *